(12) United States Patent
Jang

(10) Patent No.: US 11,546,583 B2
(45) Date of Patent: Jan. 3, 2023

(54) IMAGE ENCODING/DECODING METHOD AND DEVICE FOR DETERMINING DIVISION MODE ON BASIS OF COLOR FORMAT, AND METHOD FOR TRANSMITTING BITSTREAM

(71) Applicant: LG ELECTRONICS INC., Seoul (KR)

(72) Inventor: Hyeong Moon Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/703,749

(22) Filed: Mar. 24, 2022

(65) Prior Publication Data
US 2022/0279172 A1    Sep. 1, 2022

Related U.S. Application Data

(63) Continuation of application No. PCT/KR2020/012902, filed on Sep. 23, 2020.
(Continued)

(51) Int. Cl.
*H04N 19/109*  (2014.01)
*H04N 19/176*  (2014.01)
(Continued)

(52) U.S. Cl.
CPC ......... *H04N 19/109* (2014.11); *H04N 19/176* (2014.11); *H04N 19/186* (2014.11); *H04N 19/70* (2014.11)

(58) Field of Classification Search
None
See application file for complete search history.

(56) References Cited

U.S. PATENT DOCUMENTS

2021/0105465 A1*  4/2021  Choi .................... H04N 19/176

FOREIGN PATENT DOCUMENTS

JP      2019-525577 A       9/2019
KR    10-2015-0139884 A    12/2015
(Continued)

*Primary Examiner* — Christopher Braniff
(74) *Attorney, Agent, or Firm* — Dentons US LLP

(57) ABSTRACT

An image encoding/decoding method and apparatus are provided. An image decoding method performed by an image decoding apparatus may comprise determining prediction mode characteristic information based on a color format of a current block, determining a prediction mode type of a lower-layer block split from the current block based on the prediction mode characteristic information, obtaining the lower-layer block by splitting the current block based on the prediction mode type of the lower-layer block, and decoding the lower-layer block based on the prediction mode type of the lower-layer block. The prediction mode type of the lower-layer block comprises a first prediction mode type specifying that both an intra prediction mode and an inter prediction mode are available, a second prediction mode type specifying that only the intra prediction mode is available and a third prediction mode type specifying that only the inter prediction mode is available. Based on a first condition for the current block being satisfied, the prediction mode characteristic information has a first value, and the first condition comprises a case where a color format of the current block is a monochrome format or a 4:4:4 format. Based on the first condition for the current block being not satisfied, the prediction mode characteristic information has a second value or a third value based on at least one of a color format, split mode or size of the current block.

14 Claims, 20 Drawing Sheets

Related U.S. Application Data

(60) Provisional application No. 62/905,408, filed on Sep. 25, 2019.

(51) Int. Cl.
  *H04N 19/186*   (2014.01)
  *H04N 19/70*   (2014.01)

(56) References Cited

FOREIGN PATENT DOCUMENTS

| | | | |
|---|---|---|---|
| KR | 10-2016-0130869 A | 11/2016 |
| KR | 10-2019-0058631 A | 5/2019 |
| KR | 10-2019-0081383 A | 7/2019 |

* cited by examiner

FIG. 5B
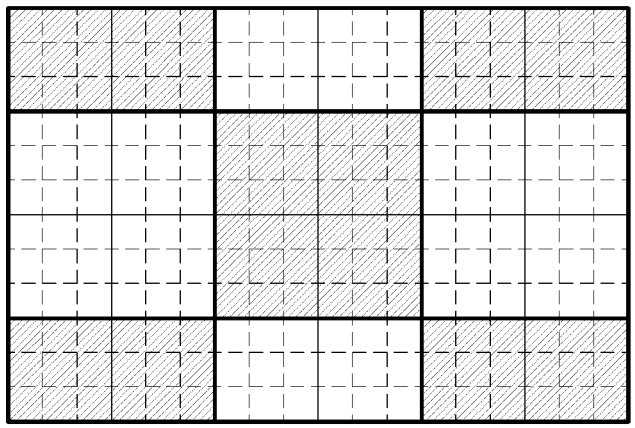
FIG. 5C
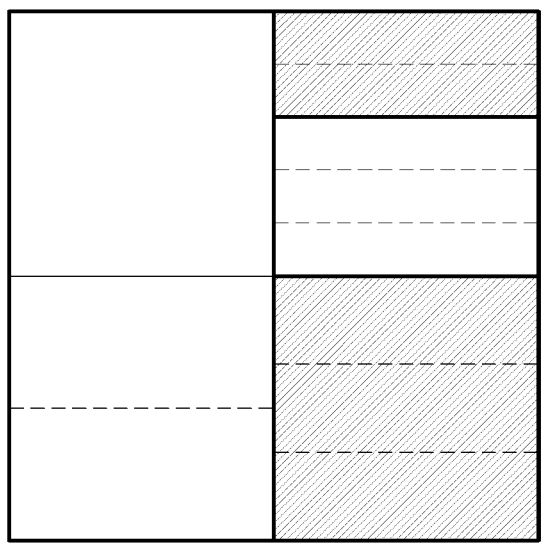
FIG. 6
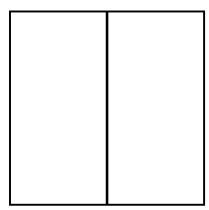 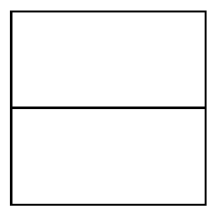 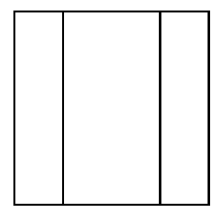 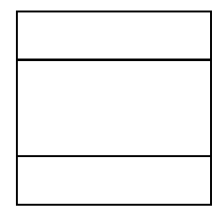
SPLIT_BT_VER  SPLIT_BT_HOR  SPLIT_TT_VER  SPLIT_TT_HOR X = Location of luma sample
O = Location of chroma sample X = Location of luma sample
O = Location of chroma sample X = Location of luma sample
O = Location of chroma sample

FIG. 17A

| coding_tree( x0, y0, cbWidth, cbHeight, qgOnY, qgOnC, cbSubdiv, cqtDepth, mttDepth, depthOffset, partIdx, treeTypeCurr, modeTypeCurr ) { | Descriptor |
|---|---|
| if( ( allowSplitBtVer \|\| allowSplitBtHor \|\| allowSplitTtVer \|\| allowSplitTtHor \|\| allowSplitQT ) &&( x0 + cbWidth <= pic_width_in_luma_samples ) && (y0 + cbHeight <= pic_height_in_luma_samples ) ) | |
| split_cu_flag | ae(v) |
| if( cu_qp_delta_enabled_flag && qgOnY && cbSubdiv <= cu_qp_delta_subdiv ) { | |
| IsCuQpDeltaCoded = 0 | |
| CuQpDeltaVal = 0 | |
| CuQgTopLeftX = x0 | |
| CuQgTopLeftY = y0 | |
| } | |
| if( cu_chroma_qp_offset_enabled_flag && qgOnC && cbSubdiv <= cu_chroma_qp_offset_subdiv ) | |
| IsCuChromaQpOffsetCoded = 0 | |
| if( split_cu_flag ) { | |
| if( ( allowSplitBtVer \|\| allowSplitBtHor \|\| allowSplitTtVer \|\| allowSplitTtHor ) && allowSplitQT ) | |
| split_qt_flag | ae(v) |
| if( !split_qt_flag ) { | |
| if( ( allowSplitBtHor \|\| allowSplitTtHor ) && ( allowSplitBtVer \|\| allowSplitTtVer ) ) | |
| mtt_split_cu_vertical_flag | ae(v) |
| if( ( allowSplitBtVer && allowSplitTtVer && mtt_split_cu_vertical_flag ) \|\| ( allowSplitBtHor && allowSplitTtHor && !mtt_split_cu_vertical_flag ) ) | |
| mtt_split_cu_binary_flag | ae(v) |
| } | |
| if( modeTypeCondition == 1 ) | |
| modeType = MODE_TYPE_INTRA | |
| else if( modeTypeCondition == 2 ) { | |
| mode_constraint_flag | ae(v) |
| modeType = mode_constraint_flag ? MODE_TYPE_INTRA : MODE_TYPE_INTER | |
| } else { | |
| modeType = modeTypeCurr | |
| } | |
| treeType = ( modeType == MODE_TYPE_INTRA ) ? DUAL_TREE_LUMA : treeTypeCurr | |

FIG. 17B

| | |
|---|---|
| if( !split_qt_flag ) { | |
|   if( MttSplitMode[ x0 ][ y0 ][ mttDepth ] == SPLIT_BT_VER ) { | |
|     depthOffset += ( x0 + cbWidth > pic_width_in_luma_samples ) ? 1 : 0 | |
|     x1 = x0 + ( cbWidth / 2 ) | |
|     coding_tree( x0, y0, cbWidth / 2, cbHeight, qgOnY, qgOnC, cbSubdiv + 1,<br>                  cqtDepth, mttDepth + 1, depthOffset, 0, treeType, modeType ) | |
|     if( x1 < pic_width_in_luma_samples ) | |
|       coding_tree( x1, y0, cbWidth / 2, cbHeightY, qgOnY, qgOnC, cbSubdiv + 1,<br>                    cqtDepth, mttDepth + 1, depthOffset, 1, treeType, modeType ) | |
|   } else if( MttSplitMode[ x0 ][ y0 ][ mttDepth ] == SPLIT_BT_HOR ) { | |
|     depthOffset += ( y0 + cbHeight > pic_height_in_luma_samples ) ? 1 : 0 | |
|     y1 = y0 + ( cbHeight / 2 ) | |
|     coding_tree( x0, y0, cbWidth, cbHeight / 2, qgOnY, qgOnC, cbSubdiv + 1,<br>                  cqtDepth, mttDepth + 1, depthOffset, 0, treeType, modeType ) | |
|     if( y1 < pic_height_in_luma_samples ) | |
|       coding_tree( x0, y1, cbWidth, cbHeight / 2, qgOnY, qgOnC, cbSubdiv + 1,<br>                cqtDepth, mttDepth + 1, depthOffset, 1, treeType, modeType ) | |
|   } else if( MttSplitMode[ x0 ][ y0 ][ mttDepth ] == SPLIT_TT_VER ) { | |
|     x1 = x0 + ( cbWidth / 4 ) | |
|     x2 = x0 + ( 3 * cbWidth / 4 ) | |
|     qgOnY = qgOnY && ( cbSubdiv + 2 <= cu_qp_delta_subdiv ) | |
|     qgOnC = qgOnC && ( cbSubdiv + 2 <= cu_chroma_qp_offset_subdiv ) | |
|     coding_tree( x0, y0, cbWidth / 4, cbHeight, qgOnY, qgOnC, cbSubdiv + 2,<br>                cqtDepth, mttDepth + 1, depthOffset, 0, treeType, modeType ) | |
|     coding_tree( x1, y0, cbWidth / 2, cbHeight, qgOnY, qgOnC, cbSubdiv + 1,<br>                cqtDepth, mttDepth + 1, depthOffset, 1, treeType, modeType ) | |
|     coding_tree( x2, y0, cbWidth / 4, cbHeight, qgOnY, qgOnC, cbSubdiv + 2,<br>                cqtDepth, mttDepth + 1, depthOffset, 2, treeType, modeType ) | |
|   } else { /* SPLIT_TT_HOR */ | |
|     y1 = y0 + ( cbHeight / 4 ) | |
|     y2 = y0 + ( 3 * cbHeight / 4 ) | |
|     qgOnY = qgOnY && ( cbSubdiv + 2 <= cu_qp_delta_subdiv ) | |
|     qgOnC = qgOnC && ( cbSubdiv + 2 <= cu_chroma_qp_offset_subdiv ) | |
|     coding_tree( x0, y0, cbWidth, cbHeight / 4, qgOnY, qgOnC, cbSubdiv + 2,<br>                cqtDepth, mttDepth + 1, depthOffset, 0, treeType, modeType ) | |
|     coding_tree( x0, y1, cbWidth, cbHeight / 2, qgOnY, qgOnC, cbSubdiv + 1,<br>                cqtDepth, mttDepth + 1, depthOffset, 1, treeType, modeType ) | |
|     coding_tree( x0, y2, cbWidth, cbHeight / 4, qgOnY, qgOnC, cbSubdiv + 2,<br>                cqtDepth, mttDepth + 1, depthOffset, 2, treeType, modeType ) | |
|   } | |

1770 refers to the above block.

FIG. 17C

| | |
|---|---|
| } else { | |
|   x1 = x0 + ( cbWidth / 2 ) | |
|   y1 = y0 + ( cbHeight / 2 ) | |
|   coding_tree( x0, y0, cbWidth / 2, cbHeight / 2, qgOnY, qgOnC, cbSubdiv + 2,<br>              cqtDepth + 1, 0, 0, 0, treeType, modeType ) | |
|   if( x1 < pic_width_in_luma_samples ) | |
|     coding_tree( x1, y0, cbWidth / 2, cbHeight / 2, qgOnY, qgOnC, cbSubdiv + 2,<br>                cqtDepth + 1, 0, 0, 1, treeType, modeType ) | |
|   if( y1 < pic_height_in_luma_samples ) | |
|     coding_tree( x0, y1, cbWidth / 2, cbHeight / 2, qgOnY, qgOnC, cbSubdiv + 2,<br>                cqtDepth + 1, 0, 0, 2, treeType, modeType ) | |
|   if( y1 < pic_height_in_luma_samples && x1 < pic_width_in_luma_samples ) | |
|     coding_tree( x1, y1, cbWidth / 2, cbHeight / 2, qgOnY, qgOnC, cbSubdiv + 2,<br>                cqtDepth + 1, 0, 0, 3, treeType, modeType ) | |
| } | |
| if( modeTypeCur == MODE_TYPE_ALL && modeType == MODE_TYPE_INTRA ) { | |
|   coding_tree( x0, y0, cbWidth, cbHeight, qgOnY, qgOnC, cbSubdiv, cqtDepth, mttDepth, 0, 0<br>              DUAL_TREE_CHROMA , modeType ) | |
| } | |

1780 refers to the final block.

FIG. 18

The variable modeTypeCondition is derived as follows:

* (CONDITION 1) If one of the following conditions is true, modeTypeCondition is set equal to 0
    - slice_type == I and qtbtt_dual_tree_intra_flag is equal to 1
    - modeTypeCurr is not equal to MODE_TYPE_ALL

* (CONDITION 2) Otherwise, if one of the following conditions is true, modeTypeCondition is set equal to 1
    - cbWidth * cbHeight is equal to 64 and split_qt_flag is equal to 1
    - cbWidth * cbHeight is equal to 64 and MttSplitMode[ x0 ][ y0 ][ mttDepth ] is equal to SPLIT_TT_HOR or SPLIT_TT_VER
    - cbWidth * cbHeight is equal to 32 and MttSplitMode[ x0 ][ y0 ][ mttDepth ] is equal to SPLIT_BT_HOR or SPLIT_BT_VER

* (CONDITION 3) Otherwise, if one of the following conditions is true, modeTypeCondition is set equal to 1 + (slice_type != I ? 1 : 0)
    - cbWidth * cbHeight is equal to 64 and MttSplitMode[ x0 ][ y0 ][ mttDepth ] is equal to SPLIT_BT_HOR or SPLIT_BT_VER
    - cbWidth * cbHeight is equal to 128 and MttSplitMode[ x0 ][ y0 ][ mttDepth ] is equal to SPLIT_TT_HOR or SPLIT_TT_VER

* Otherwise, modeTypeCondition is set equal to 0

FIG. 19A

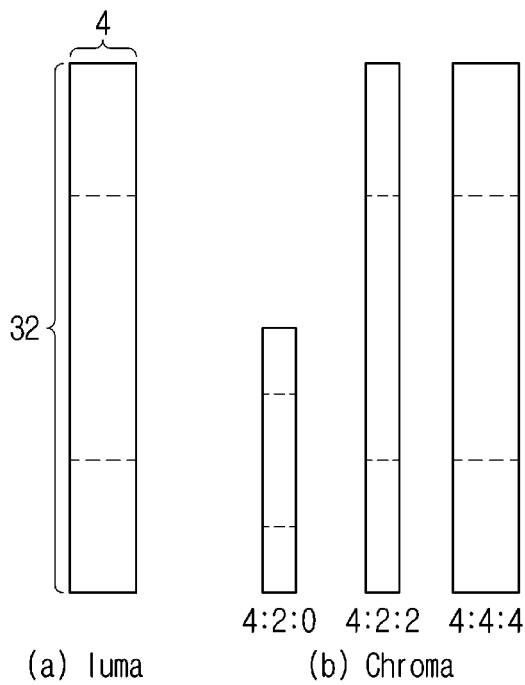

(a) luma          (b) Chroma
                4:2:0  4:2:2  4:4:4

(a) luma      4:2:0    4:2:2    4:4:4
(b) Chroma (a) luma      4:2:0    4:2:2    4:4:4
(b) Chroma (a) luma      4:2:0    4:2:2    4:4:4
(b) Chroma (a) luma      4:2:0    4:2:2    4:4:4
(b) Chroma

The variable modeTypeCondition is derived as follows:

* (CONDITION 4) If one of the following conditions is true, modeTypeCondition is set equal to 0

- slice_type == I and qtbtt_dual_tree_intra_flag is equal to 1

- modeTypeCurr is not equal to MODE_TYPE_ALL

- separate_colour_plane_flag is equal to 1

- chroma_format_idc is equal to 0

* (CONDITION 5) Otherwise, if one of the following conditions is true, modeTypeCondition is set equal to 1

- (cbWidth/subWidthC) * (cbHeight/subHeightC) is equal to 16 and split_qt_flag is equal to 1

- (cbWidth/subWidthC) * (cbHeight/subHeightC) is equal to 16 and MttSplitMode[ x0 ][ y0 ][ mttDepth ] is equal to SPLIT_TT_HOR or SPLIT_TT_VER

* (CONDITION 6) Otherwise, if one of the following conditions is true, modeTypeCondition is set equal to 1 + (slice_type != I ? 1 : 0)

- (cbWidth/subWidthC) * (cbHeight/subHeightC) is equal to 16 and MttSplitMode[ x0 ][ y0 ][ mttDepth ] is equal to SPLIT_BT_HOR or SPLIT_BT_VER

- (cbWidth/subWidthC) * (cbHeight/subHeightC) is equal to 32 and MttSplitMode[ x0 ][ y0 ][ mttDepth ] is equal to SPLIT_TT_HOR or SPLIT_TT_VER

* Otherwise, modeTypeCondition is set equal to 0

IMAGE ENCODING/DECODING METHOD AND DEVICE FOR DETERMINING DIVISION MODE ON BASIS OF COLOR FORMAT, AND METHOD FOR TRANSMITTING BITSTREAM

This application is a Continuation Application of International Application No. PCT/KR2020/012902, filed on Sep. 23, 2020, which claims the benefit of U.S. Provisional Application No. 62/905,408, filed on Sep. 25, 2019, the contents of which are all hereby incorporated by reference herein in their entirety.

TECHNICAL FIELD

The present disclosure relates to an image encoding/decoding method and apparatus and a method of transmitting a bitstream, and, more particularly, to an image encoding/decoding method and apparatus determining a split mode based on a color format, and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus determining a split mode based on a color format.

Another object of the present disclosure is to provide an image encoding/decoding method and apparatus determining a split mode based on a size of a chroma block.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method performed by an image decoding apparatus according to an aspect of the present disclosure may comprise may comprise determining prediction mode characteristic information based on a color format of a current block, determining a prediction mode type of a lower-layer block split from the current block based on the prediction mode characteristic information, obtaining the lower-layer block by splitting the current block based on the prediction mode type of the lower-layer block, and decoding the lower-layer block based on the prediction mode type of the lower-layer block. The prediction mode type of the lower-layer block comprises a first prediction mode type specifying that both an intra prediction mode and an inter prediction mode are available, a second prediction mode type specifying that only the intra prediction mode is available and a third prediction mode type specifying that only the inter prediction mode is available. Based on a first condition for the current block being satisfied, the prediction mode characteristic information has a first value, and the first condition comprises a case where a color format of the current block is a monochrome format or a 4:4:4 format. Based on the first condition for the current block being not satisfied, the prediction mode characteristic information has a second value or a third value based on at least one of a color format, split mode or size of the current block.

An image decoding apparatus according to an aspect of the present disclosure may comprise a memory and at least one processor. The at least one processor may determine prediction mode characteristic information based on a color format of a current block, determine a prediction mode type of a lower-layer block split from the current block based on the prediction mode characteristic information, obtain the lower-layer block by splitting the current block based on the prediction mode type of the lower-layer block, and decode the lower-layer block based on the prediction mode type of the lower-layer block. The prediction mode type of the lower-layer block comprises a first prediction mode type specifying that both an intra prediction mode and an inter prediction mode are available, a second prediction mode type specifying that only the intra prediction mode is available and a third prediction mode type specifying that only the inter prediction mode is available. Based on a first condition for the current block being satisfied, the prediction mode characteristic information has a first value, and the first condition comprises a case where a color format of the current block is a monochrome format or a 4:4:4 format. Based on the first condition for the current block being not satisfied, the prediction mode characteristic information has a second value or a third value based on at least one of a color format, split mode or size of the current block.

An image encoding method performed by an image encoding apparatus according to an aspect of the present disclosure may comprise determining prediction mode characteristic information based on a color format of a current block, determining a prediction mode type of a lower-layer block split from the current block based on the prediction mode characteristic information, obtaining the lower-layer block by splitting the current block based on the prediction mode type of the lower-layer block, and encoding the lower-layer block based on the prediction mode type of the lower-layer block. The prediction mode type of the lower-layer block comprises a first prediction mode type specifying that both an intra prediction mode and an inter prediction mode are available, a second prediction mode type specifying that only the intra prediction mode is available and a third prediction mode type specifying that only the inter prediction mode is available. Based on a first condition for the current block being satisfied, the prediction mode characteristic information has a first value, and the first condition comprises a case where a color format of the current block is a monochrome format or a 4:4:4 format. Based on the first condition for the current block being not satisfied, the prediction mode characteristic information has a second value or a third value based on at least one of a color format, split mode or size of the current block.

In addition, a transmission method according to another aspect of the present disclosure may transmit a bitstream generated by the image encoding apparatus or the image encoding method of the present disclosure.

In addition, a computer-readable recording medium according to another aspect of the present disclosure may store the bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

Also, according to the present disclosure, it is possible to provide an image encoding/decoding method and apparatus determining a split mode based on a color format.

Also, according to the present disclosure, it is possible to provide an image encoding/decoding method and apparatus determining a split mode based on a size of a chroma block.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIGS. 5A to 5C are views illustrating partitioning examples of a picture.

FIG. 6 is a view showing an embodiment of a partitioning type of a block according to a multi-type tree structure.

FIGS. 17A to 17C are views illustrating an example of syntax for switching a single tree structure to a dual tree structure.

FIG. 18 is a view illustrating an example of a process of deriving prediction mode characteristic information.

FIGS. 19A and 19B are views illustrating an example of lower-layer CUs obtained by ternary-splitting a current CU for each color format.

FIG. 22 is a view illustrating a process of deriving prediction mode characteristic information according to an embodiment of the present disclosure.

MODE FOR INVENTION

Figure 1:
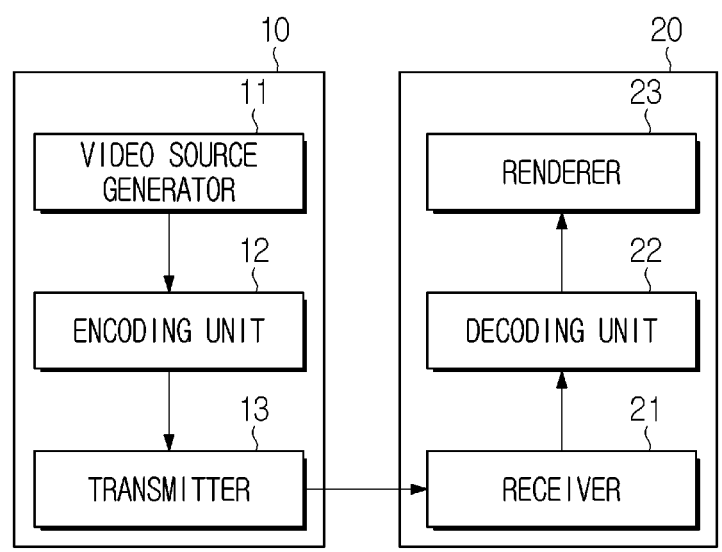
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean a block including both a luma component block and a chroma component block or "a luma block of a current block" unless explicitly stated as a chroma block. The chroma component block of the current block may be expressed by including an explicit description of a luma component block, such as "luma block" or "current luma block". In addition, the chroma component block of the current block may be explicitly expressed by including an explicit description of the chroma component block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system, to which an embodiment of the present disclosure is applicable.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
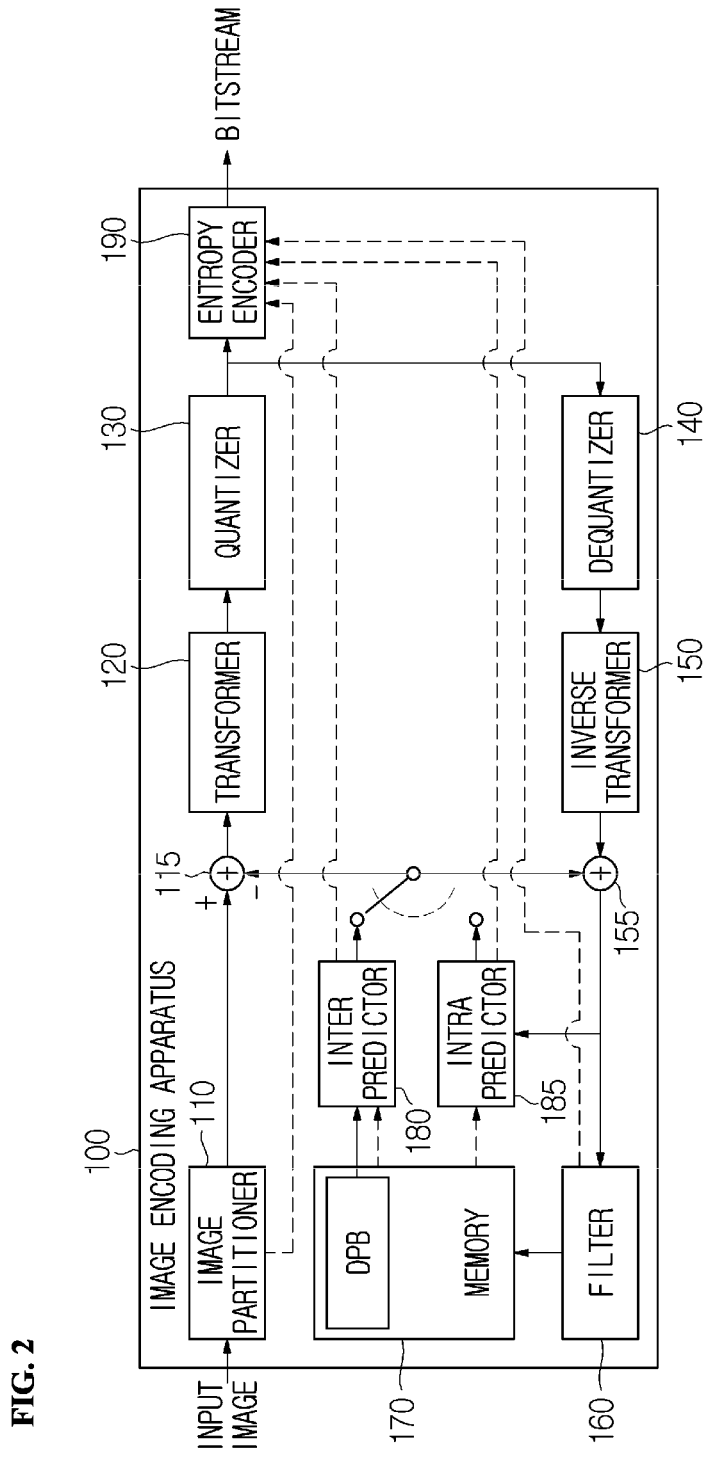
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information specifying which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loeve transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
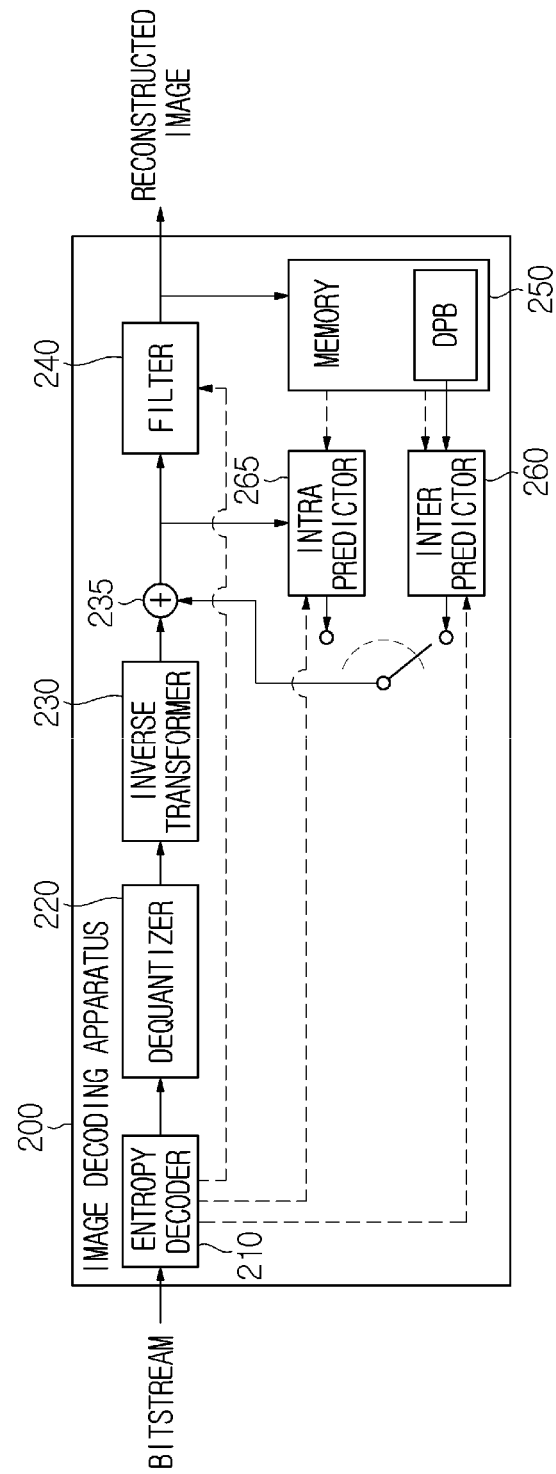
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information specifying a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

Overview of Image Partitioning

The video/image coding method according to the present disclosure may be performed based on an image partitioning structure as follows. Specifically, the procedures of prediction, residual processing ((inverse) transform, (de)quantization, etc.), syntax element coding, and filtering, which will be described later, may be performed based on a CTU, CU (and/or TU, PU) derived based on the image partitioning structure. The image may be partitioned in block units and the block partitioning procedure may be performed in the image partitioner 110 of the encoding apparatus. The partitioning related information may be encoded by the entropy encoder 190 and transmitted to the decoding apparatus in the form of a bitstream. The entropy decoder 210 of the decoding apparatus may derive a block partitioning structure of the current picture based on the partitioning related information obtained from the bitstream, and based on this, may perform a series of procedures (e.g., prediction, residual processing, block/picture reconstruction, in-loop filtering, etc.) for image decoding. A CU size and a TU size may be the same or a plurality of TUs may be present in a CU area. Meanwhile, the CU size may generally represent a luma component (sample) CB size. The TU size may generally represent a luma component (sample) TB size. A chroma component (sample) CB or TB size may be derived based on a luma component (sample) CB or TB size according to a component ratio according to a chroma format (color format, e.g., 4:4:4, 4:2:2, 4:2:0, etc.) of a picture/image. The TU size may be derived based on maxTbSize specifying an available maximum TB size. For example, when the CU size is greater than maxTbSize, a plurality of TUs (TBs) of maxTbSize may be derived from the CU and transform/inverse transform may be performed in units TUs (TBs). In addition, for example, when applying intra prediction, an intra prediction mode/type may be derived in units of CUs (or CBs), and a neighboring reference sample derivation and prediction sample generation procedure may be performed in units TUs (or TBs). In this case, one or a plurality of TUs (or TBs) may be present in one CU (or CB) area and, in this case, the plurality of TUs (or TBs) may share the same intra prediction mode/type.

In addition, in image encoding and decoding according to the present disclosure, an image processing unit may have a hierarchical structure. For example, one picture may be partitioned into one or more tiles or tile groups. One tile group may include one or more tiles. One tile may include one or more CTUs. The CTU may be partitioned into one or more CUs, as described above. The tile may consist of a rectangular region including CTUs assembled in a specific row and a specific column in a picture. The tile group may include an integer number of tiles according to tile-raster scan. A tile group header may signal information/parameters applicable to a corresponding tile group. When an encoding/decoding apparatus has a multi-core processor, an encoding/decoding procedure for the tile or tile group may be performed in parallel. Here, the tile group may have one of tile group types including an intra (I) tile group, a predictive (P) tile group and a bi-predictive (B) tile group. For blocks in the I tile group, inter prediction may not be used and only intra prediction may be used for prediction. Of course, even in this case, an original sample value may be coded and signalled without prediction. For blocks in the P tile group, intra prediction or inter prediction may be used, and only uni-prediction may be used when inter prediction. Meanwhile, for blocks in the B tile group, intra prediction or inter prediction may be used, and up to bi prediction may be used when inter prediction is used.

In an encoding apparatus, a tile/tile group, a slice, and a maximum and minimum coding unit size may be determined according to the characteristics (e.g., resolution) of an image and in consideration of coding efficiency or parallel processing and information thereon or information capable of deriving the same may be included in a bitstream.

In a decoding apparatus, information specifying a slice of a current picture, a tile/tile group or a CTU in a tile is partitioned into a plurality of coding units may be obtained. When such information is obtained (transmitted) only under specific conditions, efficiency may increase.

The slice header or the tile group header (tile group header syntax) may include information/parameters commonly applicable to the slice or tile group. APS (APS syntax) or PPS (PPS syntax) may include information/parameters commonly applicable to one or more pictures. The SPS (SPS syntax) may include information/parameters commonly applicable to one or more sequences. The VPS (VPS syntax) may include information/parameters commonly applicable to the entire video. In the present disclosure, higher level syntax may include at least one of the APS syntax, the PPS syntax, the SPS syntax or the VPS syntax.

In addition, for example, information on partitioning and construction of the tile/tile group may be constructed at an encoding stage through the higher level syntax and transmitted to a decoding apparatus in the form of a bitstream.

Partitioning Structure

Figure 4:
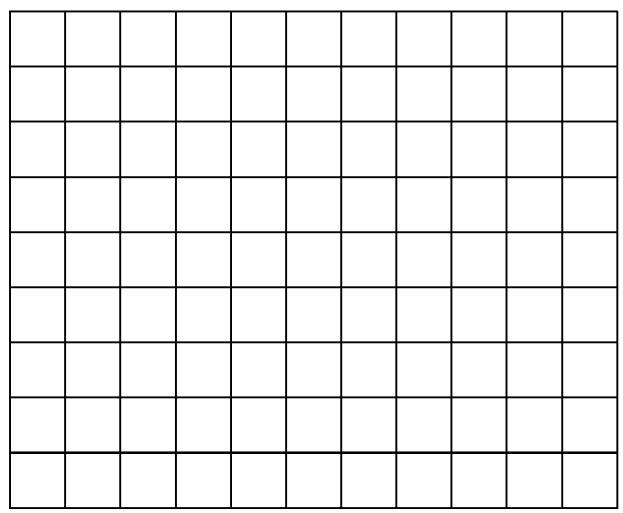
FIG. 4 shows an example in which a picture is partitioned into CTUs.

Pictures may be partitioned into a sequence of coding tree units (CTUs). The CTU may correspond to a coding tree block (CTB). Alternatively, the CTU may include a coding tree block of luma samples and two coding tree blocks of corresponding chroma samples. For example, for a picture that contains three sample arrays, the CTU may include an N×N block of luma samples and two corresponding blocks of chroma samples. FIG. 4 shows an example in which a picture is partitioned into CTUs.

A maximum allowable size of a CTU for coding and prediction may be different from that of a CTU for transform. For example, even when a maximum size of a luma block in the CTU for transform is 64×64, a maximum size of a luma block for the CTU for coding and prediction may be 128×128.

In addition, a picture may be partitioned into one or more tile rows and one or more tile columns. A tile may be a sequence of CTUs covering a rectangular region in a picture.

A tile may be partitioned into one or more bricks, and each brick may consist of a plurality of CTU rows in a tile. In the present disclosure, a tile which is not partitioned into a plurality of bricks may be referred to as a brick.

A slice may include a plurality of tiles in a picture or a plurality of bricks in a tile. Two modes of a slice may be supported. One may be a raster scan slice mode and the other may be a rectangular slice mode.

In the raster slice mode, a slice may include a plurality of consecutive tiles within a picture according to a raster scan order. In the present disclosure, a slice according to the raster scan slice mode may be referred to as a raster scan slice.

In the rectangular slice mode, a slice may include a plurality of bricks constructing a rectangular region within a picture. In the present disclosure, a slice according to the rectangular slice mode may be referred to as a rectangular slice. A plurality of bricks included in the rectangular slice may exist according to the brick raster scan order of the slice.

Figure 5A:
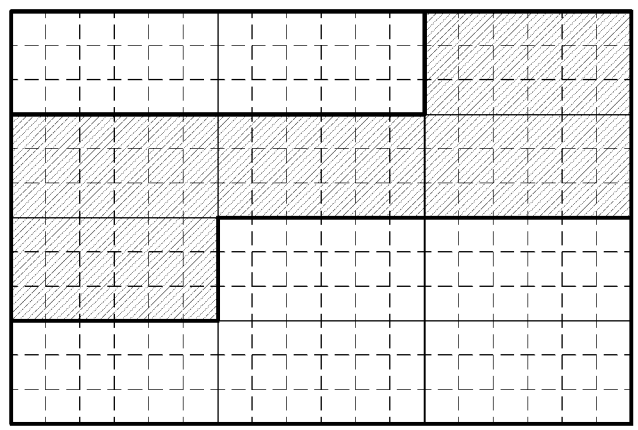

FIGS. 5A to 5C are views illustrating partitioning examples of a picture.

First, referring to FIG. 5A, in the raster scan slice mode, ap picture may be partitioned into 12 tiles and three raster scan slices.

Referring to FIG. 5B, in the rectangular slice mode, a picture may be partitioned into 24 tiles (that is, six tile rows and four tile columns) and nine rectangular slices.

Referring to FIG. 5C, a picture may be partitioned into four tiles (that is, two tile rows and two tile columns), 11 bricks (that is, one top-left brick, five top-right bricks, two bottom-left bricks and three bottom-right bricks) and four rectangular slices.

Overview of Partitioning of CTU

As described above, the coding unit (CU) may be acquired by recursively partitioning the coding tree unit (CTU) or the largest coding unit (LCU) according to a quad-tree/binary-tree/ternary-tree (QT/BT/TT) structure. For example, the CTU may be first partitioned into quadtree structures. Thereafter, leaf nodes of the quadtree structure may be further partitioned by a multi-type tree structure.

Partitioning according to quadtree means that a current CU (or CTU) is partitioned into equally four. By partitioning according to quadtree, the current CU may be partitioned into four CUs having the same width and the same height. When the current CU is no longer partitioned into the quadtree structure, the current CU corresponds to the leaf node of the quad-tree structure. The CU corresponding to the leaf node of the quadtree structure may be no longer partitioned and may be used as the above-described final coding unit. Alternatively, the CU corresponding to the leaf node of the quadtree structure may be further partitioned by a multi-type tree structure.

FIG. 6 is a view showing an embodiment of a partitioning type of a block according to a multi-type tree structure. Partitioning according to the multi-type tree structure may include two types of splitting according to a binary tree structure and two types of splitting according to a ternary tree structure.

The two types of splitting according to the binary tree structure may include vertical binary splitting (SPLIT_BT_VER) and horizontal binary splitting (SPLIT_BT_HOR). Vertical binary splitting (SPLIT_BT_VER) means that the current CU is split into equally two in the vertical direction. As shown in FIG. 5, by vertical binary splitting, two CUs having the same height as the current CU and having a width which is half the width of the current CU may be generated. Horizontal binary splitting (SPLIT_BT_HOR) means that the current CU is split into equally two in the horizontal direction. As shown in FIG. 5, by horizontal binary splitting, two CUs having a height which is half the height of the current CU and having the same width as the current CU may be generated.

Two types of splitting according to the ternary tree structure may include vertical ternary splitting (SPLIT_TT_VER) and horizontal ternary splitting (SPLIT_TT_HOR). In vertical ternary splitting (SPLIT_TT_VER), the current CU is split in the vertical direction at a ratio of 1:2:1. As shown in FIG. 5, by vertical ternary splitting, two CUs having the same height as the current CU and having a width which is ¼ of the width of the current CU and a CU having the same height as the current CU and having a width which is half the width of the current CU may be generated. In horizontal ternary splitting (SPLIT_TT_HOR), the current CU is split in the horizontal direction at a ratio of 1:2:1. As shown in FIG. 5, by horizontal ternary splitting, two CUs having a height which is ¼ of the height of the current CU and having the same width as the current CU and a CU having a height which is half the height of the current CU and having the same width as the current CU may be generated.

Figure 7:
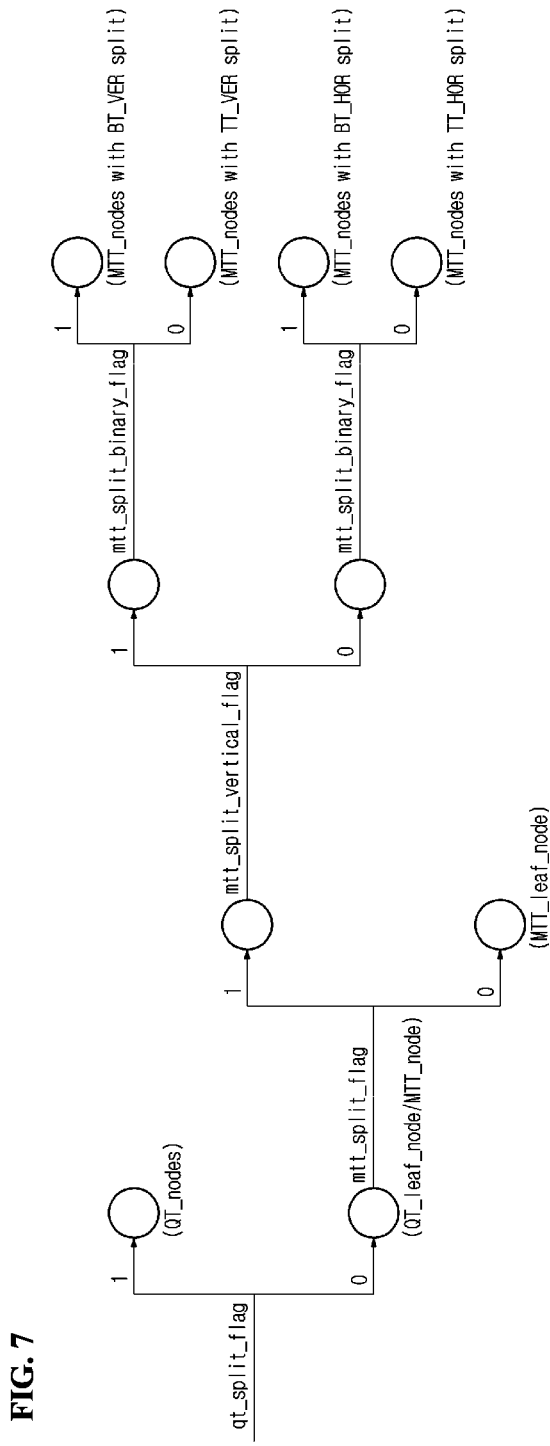
FIG. 7 is a view showing a signaling mechanism of block splitting information in a quadtree with nested multi-type tree structure according to the present disclosure.

FIG. 7 is a view showing a signaling mechanism of block splitting information in a quadtree with nested multi-type tree structure according to the present disclosure.

Here, the CTU is treated as the root node of the quadtree, and is partitioned for the first time into a quadtree structure. Information (e.g., qt_split_flag) specifying whether quadtree splitting is performed on the current CU (CTU or node (QT_node) of the quadtree) is signaled. For example, when qt_split_flag has a first value (e.g., "1"), the current CU may be quadtree-partitioned. In addition, when qt_split_flag has a second value (e.g., "0"), the current CU is not quadtree-partitioned, but becomes the leaf node (QT_leaf_node) of the quadtree. Each quadtree leaf node may then be further partitioned into multitype tree structures. That is, the leaf node of the quadtree may become the node (MTT_node) of the multi-type tree. In the multitype tree structure, a first flag (e.g., Mtt_split_cu_flag) is signaled to specify whether the current node is additionally partitioned. If the corresponding node is additionally partitioned (e.g., if the first flag is 1), a second flag (e.g., Mtt_split_cu_vertical_flag) may be signaled to specify the splitting direction. For example, the splitting direction may be a vertical direction if the second flag is 1 and may be a horizontal direction if the second flag is 0. Then, a third flag (e.g., Mtt_split_cu_binary_flag) may be signaled to specify whether the split type is a binary split type or a ternary split type. For example, the split type may be a binary split type when the third flag is 1 and may be a ternary split type when the third flag is 0. The node of the multi-type tree acquired by binary splitting or ternary splitting may be further partitioned into multi-type tree structures. However, the node of the multi-type tree may not be partitioned into quadtree structures. If the first flag is 0, the corresponding node of the multi-type tree is no longer split but becomes the leaf node (MTT_leaf_node) of the multi-type tree. The CU corresponding to the leaf node of the multi-type tree may be used as the above-described final coding unit.

Based on the mtt_split_cu_vertical_flag and the mtt_split_cu_binary_flag, a multi-type tree splitting mode (MttSplitMode) of a CU may be derived as shown in Table 1 below. In the following description, the multi-type tree splitting mode may be referred to as a multi-tree splitting type or splitting type.

Figure 8:
FIG. 8 is a view showing an example in which a CTU is partitioned into multiple CUs by applying a multi-type tree after applying a quadtree.

FIG. 8 is a view showing an example in which a CTU is partitioned into multiple CUs by applying a multi-type tree after applying a quadtree. In FIG. 8, bold block edges 810 represent quadtree partitioning and the remaining edges 820 represent multitype tree partitioning. The CU may correspond to a coding block (CB). In an embodiment, the CU may include a coding block of luma samples and two coding blocks of chroma samples corresponding to the luma samples.

A chroma component (sample) CB or TB size may be derived based on a luma component (sample) CB or TB size according to the component ratio according to the color format (chroma format, e.g., 4:4:4, 4:2:2, 4:2:0 or the like) of the picture/image. In case of 4:4:4 color format, the chroma component CB/TB size may be set equal to be luma component CB/TB size. In case of 4:2:2 color format, the width of the chroma component CB/TB may be set to half the width of the luma component CB/TB and the height of the chroma component CB/TB may be set to the height of the luma component CB/TB. In case of 4:2:0 color format, the width of the chroma component CB/TB may be set to half the width of the luma component CB/TB and the height of the chroma component CB/TB may be set to half the height of the luma component CB/TB.

In an embodiment, when the size of the CTU is 128 based on the luma sample unit, the size of the CU may have a size from 128×128 to 4×4 which is the same size as the CTU. In one embodiment, in case of 4:2:0 color format (or chroma format), a chroma CB size may have a size from 64×64 to 2×2.

Meanwhile, in an embodiment, the CU size and the TU size may be the same. Alternatively, there may be a plurality of TUs in a CU region. The TU size generally represents a luma component (sample) transform block (TB) size.

The TU size may be derived based a largest allowable TB size maxTbSize which is a predetermined value. For example, when the CU size is greater than maxTbSize, a plurality of TUs (TBs) having maxTbSize may be derived from the CU and transform/inverse transform may be performed in units of TU (TB). For example, the largest allowable luma TB size may be 64×64 and the largest allowable chroma TB size may be 32×32. If the width or height of the CB partitioned according to the tree structure is larger than the largest transform width or height, the CB may be automatically (or implicitly) partitioned until the TB size limit in the horizontal and vertical directions is satisfied.

In addition, for example, when intra prediction is applied, an intra prediction mode/type may be derived in units of CU (or CB) and a neighboring reference sample derivation and prediction sample generation procedure may be performed in units of TU (or TB). In this case, there may be one or a plurality of TUs (or TBs) in one CU (or CB) region and, in this case, the plurality of TUs or (TBs) may share the same intra prediction mode/type.

Meanwhile, for a quadtree coding tree scheme with nested multitype tree, the following parameters may be signaled as SPS syntax elements from the encoding apparatus to the

TABLE 1

| MttSplitMode | mtt_split_cu_vertical_flag | mtt_split_cu_binary_flag |
| --- | --- | --- |
| SPLIT_TT_HOR | 0 | 0 |
| SPLIT_BT_HOR | 0 | 1 |
| SPLIT_TT_VER | 1 | 0 |
| SPLIT_BT_VER | 1 | 1 | decoding apparatus. For example, at least one of a CTU size which is a parameter representing the root node size of a quadtree, MinQTSize which is a parameter representing the minimum allowed quadtree leaf node size, MaxBtSize which is a parameter representing the maximum allowed binary tree root node size, MaxTtSize which is a parameter representing the maximum allowed ternary tree root node size, MaxMttDepth which is a parameter representing the maximum allowed hierarchy depth of multi-type tree splitting from a quadtree leaf node, MinBtSize which is a parameter representing the minimum allowed binary tree leaf node size, or MinTtSize which is a parameter representing the minimum allowed ternary tree leaf node size is signaled.

As an embodiment of using 4:2:0 chroma format, the CTU size may be set to 128×128 luma blocks and two 64×64 chroma blocks corresponding to the luma blocks. In this case, MinOTSize may be set to 16×16, MaxBtSize may be set to 128×128, MaxTtSzie may be set to 64×64, MinBtSize and MinTtSize may be set to 4×4, and MaxMttDepth may be set to 4. Quadtree partitioning may be applied to the CTU to generate quadtree leaf nodes. The quadtree leaf node may be called a leaf QT node. Quadtree leaf nodes may have a size from a 16×16 size (e.g., the MinOTSize) to a 128×128 size (e.g., the CTU size). If the leaf QT node is 128×128, it may not be additionally partitioned into a binary tree/ternary tree. This is because, in this case, even if partitioned, it exceeds MaxBtsize and MaxTtszie (e.g., 64×64). In other cases, leaf QT nodes may be further partitioned into a multitype tree. Therefore, the leaf QT node is the root node for the multi-type tree, and the leaf QT node may have a multitype tree depth (mttDepth) 0 value. If the multitype tree depth reaches MaxMttdepth (e.g., 4), further partitioning may not be considered further. If the width of the multitype tree node is equal to MinBtSize and less than or equal to 2×MinTtSize, then no further horizontal partitioning may be considered. If the height of the multitype tree node is equal to MinBtSize and less than or equal to 2×MinTtSize, no further vertical partitioning may be considered. When partitioning is not considered, the encoding apparatus may skip signaling of partitioning information. In this case, the decoding apparatus may derive partitioning information with a predetermined value.

Meanwhile, one CTU may include a coding block of luma samples (hereinafter referred to as a "luma block") and two coding blocks of chroma samples corresponding thereto (hereinafter referred to as "chroma blocks"). The above-described coding tree scheme may be equally or separately applied to the luma block and chroma block of the current CU. Specifically, the luma and chroma blocks in one CTU may be partitioned into the same block tree structure and, in this case, the tree structure is represented as SINGLE_TREE. Alternatively, the luma and chroma blocks in one CTU may be partitioned into separate block tree structures, and, in this case, the tree structure may be represented as DUAL_TREE. That is, when the CTU is partitioned into dual trees, the block tree structure for the luma block and the block tree structure for the chroma block may be separately present. In this case, the block tree structure for the luma block may be called DUAL_TREE_LUMA, and the block tree structure for the chroma component may be called DUAL_TREE_CHROMA. For P and B slice/tile groups, luma and chroma blocks in one CTU may be limited to have the same coding tree structure. However, for I slice/tile groups, luma and chroma blocks may have a separate block tree structure from each other. If the separate block tree structure is applied, the luma CTB may be partitioned into CUs based on a particular coding tree structure, and the chroma CTB may be partitioned into chroma CUs based on another coding tree structure. That is, this means that a CU in an I slice/tile group, to which the separate block tree structure is applied, may include a coding block of luma components or coding blocks of two chroma components and a CU of a P or B slice/tile group may include blocks of three color components (a luma component and two chroma components).

Although a quadtree coding tree structure with a nested multitype tree has been described, a structure in which a CU is partitioned is not limited thereto. For example, the BT structure and the TT structure may be interpreted as a concept included in a multiple partitioning tree (MPT) structure, and the CU may be interpreted as being partitioned through the QT structure and the MPT structure. In an example where the CU is partitioned through a QT structure and an MPT structure, a syntax element (e.g., MPT_split_type) including information on how many blocks the leaf node of the QT structure is partitioned into and a syntax element (ex. MPT_split_mode) including information on which of vertical and horizontal directions the leaf node of the QT structure is partitioned into may be signaled to determine a partitioning structure.

In another example, the CU may be partitioned in a different way than the QT structure, BT structure or TT structure. That is, unlike that the CU of the lower depth is partitioned into ¼ of the CU of the higher depth according to the QT structure, the CU of the lower depth is partitioned into ½ of the CU of the higher depth according to the BT structure, or the CU of the lower depth is partitioned into ¼ or ½ of the CU of the higher depth according to the TT structure, the CU of the lower depth may be partitioned into ⅕, ⅓, ⅜, ⅗, ⅔, or ⅝ of the CU of the higher depth in some cases, and the method of partitioning the CU is not limited thereto.

When a portion of a tree node block exceeds a bottom picture boundary and/or a right picture boundary of a picture, the corresponding tree node block may be restricted such that samples in all coded CUs are located in the picture boundaries. In this case, for example, the following split rules may apply.

Split rule 1: As the case where a portion of the tree node block exceeds both the bottom picture boundary and the right picture boundary, when the tree node block is a QT node having a size greater than a minimum QT size, the tree node block may be split in a QT split mode and, when the tree node block has a size equal to or less than the minimum QT size or is not a QT node, the tree node block is split in a horizontal binary split mode SPLIT_BT_HOR mode.

Split rule 2: As the case where split rule 1 is not satisfied and a portion of the tree node block exceeds the bottom picture boundary, the tree node block is split in a QT split mode when the tree node block is a QT node having a size greater than a minimum QT size and a maximum BT size, and the tree node block is split in a horizontal binary split mode when the tree node block is a BTT node having a size equal to or less than the minimum QT size.

Split rule 3: As the case where split rule 1 and split rule 2 are not satisfied and a portion of the tree node block exceeds the right picture boundary, the tree node block is split in a QT split mode when the tree node block is a QT node having a size greater than a minimum QT size and a maximum BT size, and the tree node block is split in a QT split mode or horizontal binary split mode when the tree node block has a size greater than the minimum QT size and equal to or less than the maximum BT size. Alternatively, when the tree node block is a BTT node or has a size equal to or less than the minimum QT size, the tree node block is split in a horizontal binary split mode.

As described above, the quadtree coding block structure with the multi-type tree may provide a very flexible block partitioning structure. Because of the partition types supported in a multi-type tree, different partition patterns may potentially result in the same coding block structure in some cases. In the encoding apparatus and the decoding apparatus, by limiting the occurrence of such redundant partition patterns, a data amount of partitioning information may be reduced.

Figure 9:
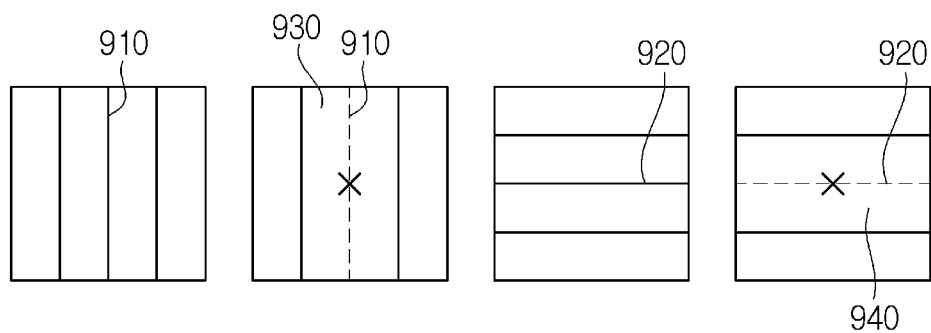
FIG. 9 shows redundant splitting patterns which may occur in binary tree splitting and ternary tree splitting.

For example, FIG. 9 shows redundant splitting patterns which may occur in binary tree splitting and ternary tree splitting. As shown in FIG. 9, continuous binary splitting 910 and 920 for one direction of two-step levels have the same coding block structure as binary splitting for a center partition after ternary splitting. In this case, binary tree splitting for center blocks 930 and 940 of ternary tree splitting may be prohibited. this prohibition is applicable to CUs of all pictures. When such specific splitting is prohibited, signaling of corresponding syntax elements may be modified by reflecting this prohibited case, thereby reducing the number of bits signaled for splitting. For example, as shown in the example shown in FIG. 9, when binary tree splitting for the center block of the CU is prohibited, a syntax element mtt_split_cu_binary_flag specifying whether splitting is binary splitting or ternary splitting is not signaled and the value thereof may be derived as 0 by a decoding apparatus.

Virtual Pipeline Data Unit

Virtual pipeline data units (VPDUs) may be defined for pipeline processing within a picture. The VPDUs may be defined as non-overlapping units within one picture. In a decoding apparatus, successive VPDUs may be simultaneously processed by multiple pipeline stages. In most pipeline stages, a VPDU size may be roughly proportional to a buffer size. Accordingly, keeping the VPDU size small is important when considering the buffer size from a point of view of hardware. In most decoding apparatuses, the VPDU size may be set equal to a maximum transform block (TB) size. For example, the VPDU size may be 64×64 (64×64 luma samples) size. In addition, the VPDU size may be changed (increased or decreased) in consideration of the above-described ternary tree (TT) and/or binary tree (BT) split.

Meanwhile, to keep the VPDU size at 64×64, at least one of the following restrictions may be applied.

Restriction 1: Ternary tree splitting for a CU having at least one of a width or height of 128 is not allowed.

Restriction 2: Horizontal binary tree splitting for a CU having a width of 128 and a height of 64 or less (i.e. 128×N CU with N≤64) is not allowed.

Restriction 3: Vertical binary tree splitting for a CU having a width of 64 or less or a height of 128 (i.e. N×128 CU with N≤64) is not allowed.

Figure 10:
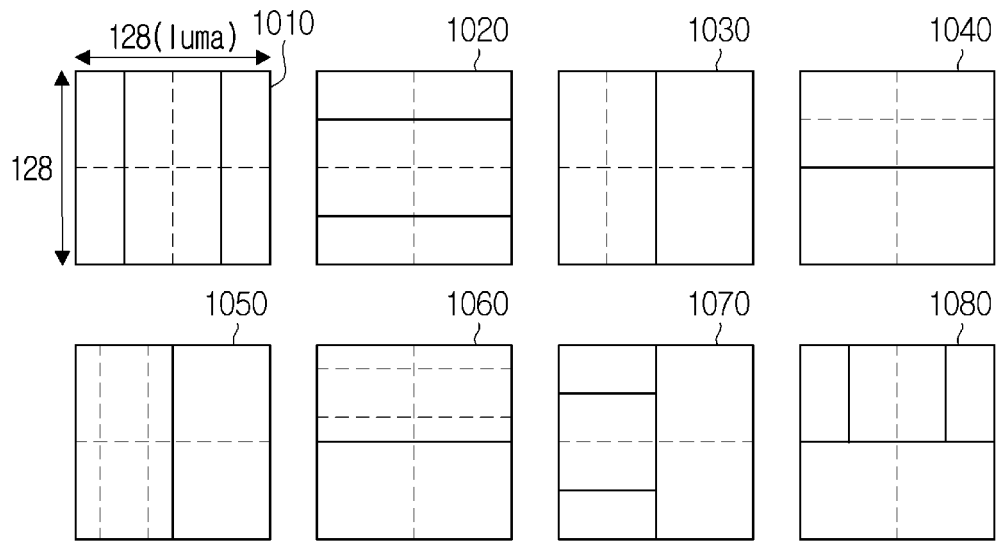
FIG. 10 is a view illustrating examples in which CU splitting is restricted.

Splitting examples of a CU now allowed under the above restrictions are shown in FIG. 10. In FIG. 10, bold solid lines denote block split and the remaining solid lines denote CUs.

Referring to FIG. 10, according to Restriction 1, vertical ternary tree splitting for a 128×128 CU 1010 is not allowed. In addition, according to Restriction 1, horizontal ternary tree splitting for a 128×128 CU 1020 is not allowed. In addition, according to Restriction 3, vertical binary tree splitting for a 64×128 CU 1030 is not allowed. In addition, according to Restriction 2, horizontal binary tree splitting for a 128×64 CU 1040 is not allowed. In addition, according to Restriction 1, vertical ternary tree splitting for a 64×128 CU 1050 is not allowed. In addition, according to Restriction 1, horizontal ternary tree splitting for a 128×64 CU 1060 is not allowed. In addition, according to Restriction 1, horizontal ternary splitting for a 64×128 CU 1070 is not allowed. In addition, according to Restriction 1, vertical ternary splitting for a 128×64 CU 1080 is not allowed.

Meanwhile, in a dual tree within an intra picture, different partitioning structures may apply to a luma coding tree and a chroma coding tree. In the dual tree, a longer coding pipeline may be introduced, and in the chroma coding tree, a chroma block having a small size such as 2×2, 4×2 and 2×4 may be allowed according to a range of a QTBT MinQTSizeC value, MinBtSizeY, and MinTTSizeY. However, this may make it difficult to design a practical decoding apparatus. In addition, a multiplication operation is required in a cross-component linear model (CCLM) mode, a planar mode, an angular mode, etc. In order to solve the above-described issues, in the dual tree, a chroma block having a small size such as 2×2, 4×2 and 2×4 may be restricted through partitioning restrictions.

Overview of Intra Prediction

Hereinafter, intra prediction according to the present disclosure will be described.

Intra prediction may indicate prediction which generates prediction samples for a current block based on reference samples in a picture to which the current block belongs (hereinafter referred to as a current picture). When intra prediction applies to the current block, neighboring reference samples to be used for intra prediction of the current block may be derived. The neighboring reference samples of the current block may include a sample adjacent to a left boundary of the current block having a size of nW×nH and a total of 2×nH samples adjacent to the bottom-left, a sample adjacent to a top boundary of the current block and a total of 2×nW samples adjacent to the top-right, and one sample adjacent to the top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to a right boundary of the current block having a size of nW×nH, a total of nW samples adjacent to a bottom boundary of the current block, and one sample adjacent to the bottom-right of the current block.

Some of the neighboring reference samples of the current block have not yet been decoded or may not be available. In this case, a decoder may construct neighboring reference samples to be used for prediction, by substituting unavailable samples with available samples. Alternatively, neighboring reference samples to be used for prediction may be constructed using interpolation of available samples.

When the neighboring reference samples are derived, (i) a prediction sample may be derived based on average or interpolation of neighboring reference samples of the current block and (ii) the prediction sample may be derived based on a reference sample present in a specific (prediction) direction with respect to the prediction sample among the neighboring reference samples of the current block. The case of (i) may be referred to as a non-directional mode or a non-angular mode and the case of (ii) may be referred to as a directional mode or an angular mode.

In addition, the prediction sample may be generated through interpolation with a first neighboring sample located in a prediction direction of the intra prediction mode of the current block and a second neighboring sample located in the opposite direction based on a prediction target sample of the current block among the neighboring reference samples. The above-described case may be referred to as linear interpolation intra prediction (LIP).

In addition, chroma prediction samples may be generated based on luma samples using a linear model. This case may be called a linear model (LM) mode.

In addition, a temporary prediction sample of the current block may be derived based on filtered neighboring reference samples, and the prediction sample of the current block may be derived by weighted-summing the temporary prediction sample and at least one reference sample derived according to the intra prediction mode among the existing neighboring reference samples, that is, the unfiltered neighboring reference samples. This case may be referred to as position dependent intra prediction (PDPC).

In addition, a reference sample line with highest prediction accuracy may be selected from multiple neighboring reference sample lines of the current block to derive a prediction sample using a reference sample located in a prediction direction in the corresponding line, and, at this time, information (e.g., intra_luma_ref_idx) on the used reference sample line may be encoded and signaled in a bitstream. This case may be referred to as multi-reference line (MRL) intra prediction or MRL based intra prediction.

In addition, the current block may be split into vertical or horizontal sub-partitions to perform intra prediction with respect to each sub-partition based on the same intra prediction mode. At this time, neighboring reference samples of intra prediction may be derived in units of sub-partitions. That is, a reconstructed sample of a previous sub-partition in encoding/decoding order may be used as a neighboring reference sample of a current sub-partition. In this case, the intra prediction mode for the current block equally applies to the sub-partitions and the neighboring reference samples are derived and used in units of sub-partitions, thereby increasing intra prediction performance Such a prediction method may be referred to as intra sub-partitions (ISP) or ISP based intra prediction.

The intra prediction technique may be referred to as various terms such as intra prediction type or additional intra prediction mode to be distinguished from a directional or non-directional intra prediction mode. For example, the intra prediction technique (intra prediction type or the additional intra prediction mode) may include at least one of LIP, LM, PDPC, MRL, ISP or MIP. Meanwhile, if necessary, post-filtering may be performed with respect to the derived prediction sample.

Specifically, the intra prediction procedure may include an intra prediction mode/type determination step, a neighboring reference sample derivation step and an intra prediction mode/type based prediction sample derivation step. In addition, if necessary, post-filtering may be performed with respect to the derived prediction sample.

Figure 11:
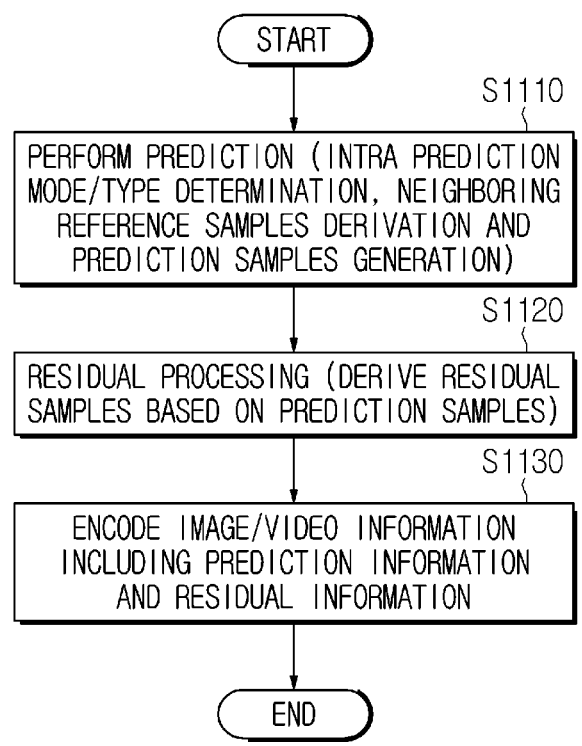
FIG. 11 is a flowchart illustrating an intra prediction based video/image encoding method.

FIG. 11 is a flowchart illustrating an intra prediction based video/image encoding method.

The encoding method of FIG. 11 may be performed by the image encoding apparatus of FIG. 2. Specifically, step S1110 may be performed by the intra prediction unit 185, and step S1120 may be performed by the residual processor. Specifically, step S1120 may be performed by the subtractor 115. Step S630 may be performed by the entropy encoder 190. The prediction information of step S1130 may be derived by the intra prediction unit 185, and the residual information of step S1130 may be derived by the residual processor. The residual information is information on the residual samples. The residual information may include information on quantized transform coefficients for the residual samples. As described above, the residual samples may be derived as transform coefficients through the transformer 120 of the image encoding apparatus, and the transform coefficients may be derived as quantized transform coefficients through the quantizer 130. Information on the quantized transform coefficients may be encoded by the entropy encoder 190 through a residual coding procedure.

The image encoding apparatus may perform inter prediction on a current block (S1110). The image encoding apparatus may determine an intra prediction mode/type for the current block, derive neighboring reference samples of the current block, and then generate prediction samples of the current block based on the intra prediction mode/type and the neighboring reference samples. Here, intra prediction mode/type determination, neighboring reference samples derivation and prediction samples generation procedures may be simultaneously performed or any one thereof may be performed before the other procedures.

Figure 12:
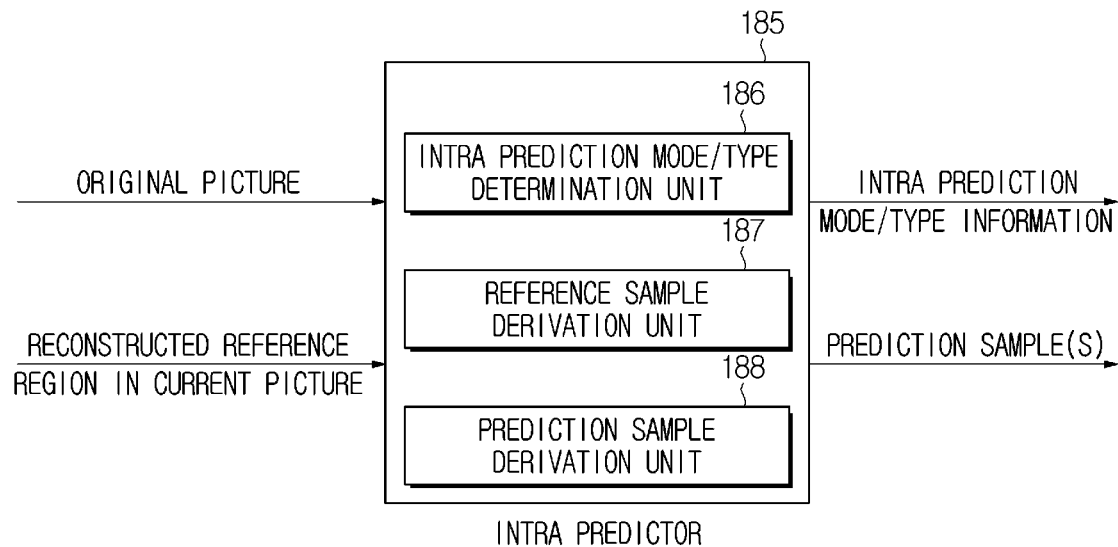
FIG. 12 is a view illustrating the configuration of an intra prediction unit according to the present disclosure.

FIG. 12 is a view illustrating the configuration of an intra prediction unit according to the present disclosure.

As shown in FIG. 12, the intra predictor 185 of the image encoding apparatus may include an intra prediction mode/type determination unit 186, a reference sample derivation unit 187 and/or a prediction sample derivation unit 188. The intra prediction mode/type determination unit 186 may determine an intra prediction mode/type for the current block. The reference sample derivation unit 187 may derive neighboring reference samples of the current block. The prediction sample derivation unit 188 may derive prediction samples of the current block. Meanwhile, although not shown, when the below-described prediction sample filtering procedure is performed, the intra predictor 185 may further include a prediction sample filter (not shown).

The image encoding apparatus may determine a mode/type applying to the current block among a plurality of intra prediction modes/types. The image encoding apparatus may compare rate distortion (RD) cost for the intra prediction modes/types and determine an optimal intra prediction mode/type for the current block.

Meanwhile, the image encoding apparatus may perform a prediction sample filtering procedure. Prediction sample filtering may be referred to as post-filtering. By the prediction sample filtering procedure, some or all of the prediction samples may be filtered. In some cases, the prediction sample filtering procedure may be omitted.

Referring to FIG. 11 again, the image encoding apparatus may generate residual samples for the current block based on the prediction samples or the filtered prediction samples (S1120). The image encoding apparatus may derive the residual samples by subtracting the prediction samples from the original samples of the current block. That is, the image encoding apparatus may derive the residual sample values by subtracting the corresponding prediction sample value from the original sample value.

The image encoding apparatus may encode image information including information on the intra prediction (prediction information) and residual information of the residual samples (1130). The prediction information may include the intra prediction mode information and/or the intra prediction technique information. The image encoding apparatus may output the encoded image information in the form of a bitstream. The output bitstream may be transmitted to the image decoding apparatus through a storage medium or a network.

The residual information may include residual coding syntax, which will be described later. The image encoding apparatus may transform/quantize the residual samples and derive quantized transform coefficients. The residual information may include information on the quantized transform coefficients.

Meanwhile, as described above, the image encoding apparatus may generate a reconstructed picture (including reconstructed samples and a reconstructed block). To this end, the image encoding apparatus may perform dequantization/inverse transform with respect to the quantized transform coefficients and derive (modified) residual samples. The reason for transforming/quantizing the residual samples and then performing dequantization/inverse transform is to derive the same residual samples as residual samples derived by the image decoding apparatus. The image encoding apparatus may generate a reconstructed bock including reconstructed samples for the current block based on the prediction samples and the (modified) residual samples. Based on the reconstructed block, the reconstructed picture for the current picture may be generated. As described above, an in-loop filtering procedure is further applicable to the reconstructed picture.

Figure 13:
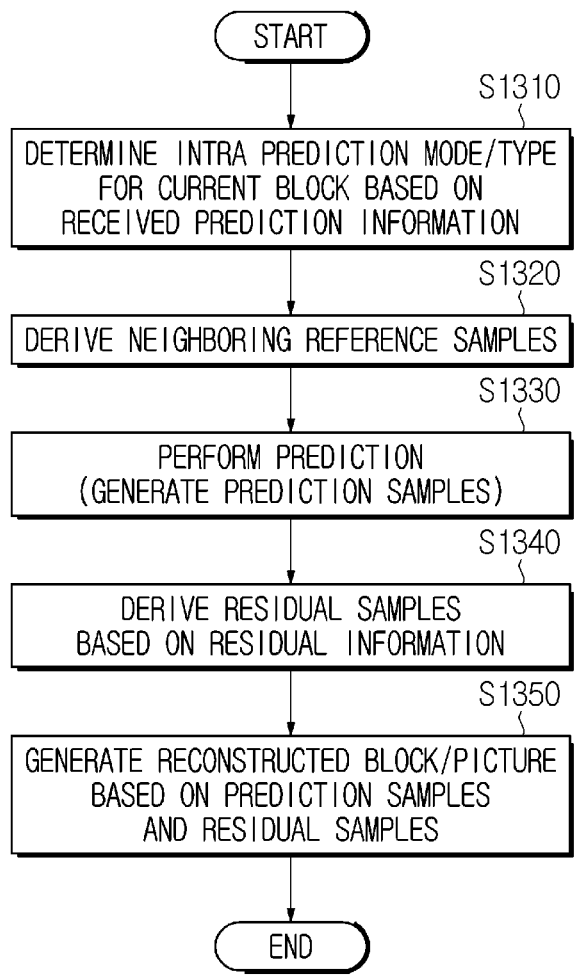
FIG. 13 is a flowchart illustrating an intra prediction based video/image decoding method.

FIG. 13 is a flowchart illustrating an intra prediction based video/image decoding method.

The image decoding apparatus may perform operation corresponding to operation performed by the image encoding apparatus.

The decoding method of FIG. 13 may be performed by the image decoding apparatus of FIG. 3. Steps S1310 to S1330 may be performed by the intra predictor 265, and the prediction information of step S1310 and the residual information of step S1340 may be obtained from a bitstream by the entropy decoder 210. The residual processor of the image decoding apparatus may derive residual samples for the current block based on the residual information (S1340). Specifically, the dequantizer 220 of the residual processor may perform dequantization based on the dequantized transform coefficients derived based on the residual information to derive transform coefficients, and the inverse transformer 230 of the residual processor may perform inverse transform with respect to the transform coefficients to derive the residual samples for the current block. Step S650 may be performed by the adder 235 or the reconstructor.

Specifically, the image decoding apparatus may derive an intra prediction mode/type for the current block based on the received prediction information (intra prediction mode/type information) (S1310). The image decoding apparatus may derive neighboring reference samples of the current block (S1320). The image decoding apparatus may generate prediction samples in the current block based on the intra prediction mode/type and the neighboring reference samples (S1330). In this case, the image decoding apparatus may perform a prediction sample filtering procedure. Prediction sample filtering may be referred to as post-filtering. By the prediction sample filtering procedure, some or all of the prediction samples may be filtered. In some cases, the prediction sample filtering procedure may be omitted.

The image decoding apparatus may generate residual samples for the current block based on the received residual information (S1340). The image decoding apparatus may generate reconstructed samples for the current block based on the prediction samples and the residual samples and derive a reconstructed block including the reconstructed samples (S1350). Based on the reconstructed block, the reconstructed picture for the current picture may be generated. An in-loop filtering procedure is further applicable to the reconstructed picture, as described above.

Figure 14:
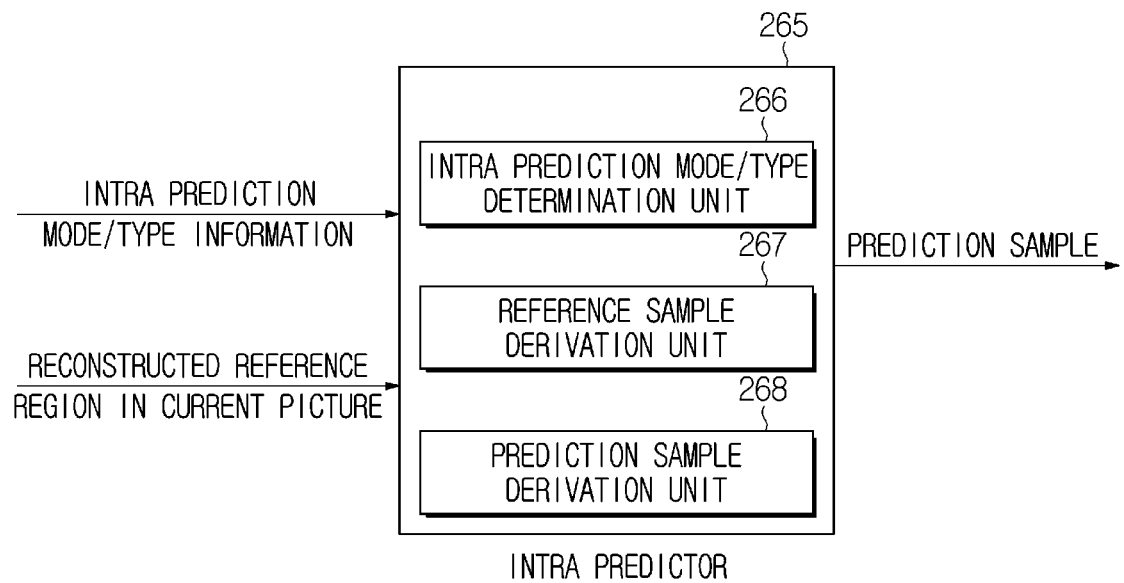
FIG. 14 is a view illustrating the configuration of an inter prediction unit according to the present disclosure.

FIG. 14 is a view illustrating the configuration of an intra predictor 265 according to the present disclosure.

As shown in FIG. 14, the intra predictor 265 of the image decoding apparatus may include an intra prediction mode/type determination unit 266, a reference sample derivation unit 267 and a prediction sample derivation unit 268. The intra prediction mode/type determination unit 266 may determine an intra prediction mode/type for the current block based on the intra prediction mode/type information generated and signaled by the intra prediction mode/type determination unit 186 of the image encoding apparatus, and the reference sample derivation unit 267 may derive neighboring reference samples of the current block from a reconstructed reference region in a current picture. The prediction sample derivation unit 268 may derive prediction samples of the current block. Meanwhile, although not shown, when the above-described prediction sample filtering procedure is performed, the intra predictor 265 may further include a prediction sample filter (not shown).

The intra prediction mode information may include, for example, flag information (e.g., intra_luma_mpm_flag and/or intra_chroma_mpm_flag) indicating whether to apply a most probable mode (MPM) or a remaining mode to the current block, and, when the MPM applies to the current block, the intra prediction mode information may further include index information (e.g., intra_luma_mpm_idx and/or intra_chroma_mpm_idx) indicating one of the intra prediction mode candidates (MPM candidates). The intra prediction mode candidates (MPM candidates) may be composed of an MPM candidate list or an MPM list. In addition, when the MPM does not apply to the current block, the intra prediction mode information may further include remaining mode information (e.g., intra_luma_mpm_remainder and/or intra_chroma_mpm_remainder) indicating one of the remaining intra prediction modes excluding the intra prediction mode candidates (MPM candidates). The image decoding apparatus may determine the intra prediction mode of the current block based on the intra prediction mode information. The MPM candidate modes may include the intra prediction modes of the neighboring blocks (e.g., the left neighboring block and/or the upper neighboring block) of the current block and additional candidate modes.

Figure 15A:
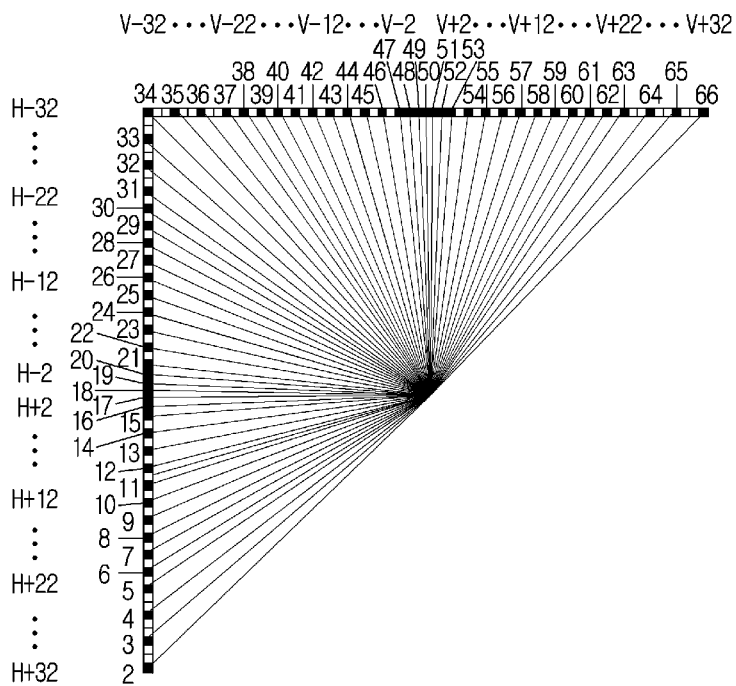
FIG. 15A is a view illustrating an intra prediction direction according to an embodiment of the present disclosure.

FIG. 15A is a view illustrating an intra prediction direction according to an embodiment of the present disclosure.

An intra prediction mode may include two non-directional intra prediction modes and 33 directional intra prediction modes. The non-directional intra prediction modes may include a planar mode and a DC mode, and the directional intra prediction modes may include intra prediction modes #2 to #34. The planar intra prediction mode may be called a planar mode and the DC intra prediction mode may be called a DC mode.

Alternatively, in order to capture any edge direction presented in natural video, as shown in FIG. 8a, the intra prediction mode may include two non-directional intra prediction modes and 65 extended directional intra prediction modes. The non-directional intra prediction modes may include a planar prediction mode and a DC prediction mode, and the extended directional intra prediction modes may include intra prediction modes #2 to #66. The intra prediction mode is applicable to blocks having all sizes and to both a luma component (luma block) and a chroma component (chroma block).

Alternatively, the intra prediction mode may include two non-directional intra prediction modes and 129 directional intra prediction modes. The non-directional intra prediction modes may include a planar prediction mode and a DC prediction mode, and the directional intra prediction modes may include intra prediction modes #2 to #130.

Meanwhile, the intra prediction mode may further include a cross-component linear model (CCLM) mode for chroma samples in addition to the above-described intra prediction modes. The CCLM mode may be split into L_CCLM, T_CCLM, LT_CCLM according to whether left samples, top samples or both thereof is considered for LM parameter derivation and may apply only to a chroma component.

The intra prediction mode may be indexed, for example, as shown in Table 2 below.

TABLE 2

| Intra prediction mode | Associated name |
|---|---|
| 0 | INTRA_PLANAR |
| 1 | INTRA_DC |
| 2 ... 66 | INTRA_ANGULAR2 ... INTRA_ANGULAR66 |
| 81 ... 83 | INTRA_LT_CCLM, INTRA_L_CCLM, INTRA_T_CCLM |

Referring to Table 2, as a non-directional intra prediction mode, a mode number of a planar mode may be 0 and a mode number of a DC mode may be 1. In addition, mode numbers of a plurality of directional intra prediction modes may be 2 to 66. In addition, an additional intra prediction mode, mode numbers of an LT_CCLM mode, an L_CCLM mode and a T_CCLM mode may be 81 to 83.

Figure 15B:
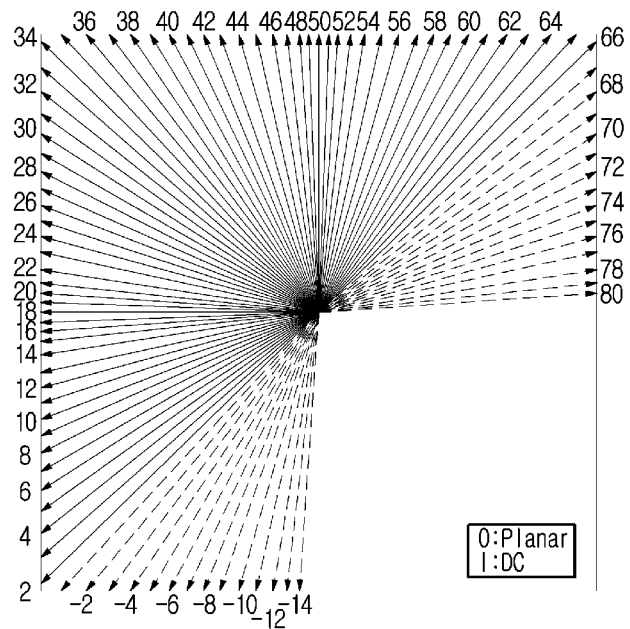
FIG. 15B is a view illustrating an intra prediction direction according to another embodiment of the present disclosure.

FIG. 15B is a view illustrating an intra prediction direction according to another embodiment of the present disclosure. In FIG. 15B, a dotted-line direction shows a wide-angle mode applying only to a non-square block. As shown in FIG. 15B, in order to capture any edge direction presented in natural video, the intra prediction mode according to an embodiment may include two non-directional intra prediction modes and 93 directional intra prediction modes. The non-directional intra prediction modes may include a planar prediction mode and a DC prediction mode, and the directional intra prediction modes may include intra prediction modes #2 to #80 to #−1 to #44, as denoted by arrow of FIG. 15B. The planar mode may be denoted by INTRA_PLANAR, and the DC mode may be denoted by INTRA_DC. In addition, the directional intra prediction mode may be denoted by INTRA_ANGULAR-14 to INTRA_ANGULAR-1 and INTRA_ANGULAR2 to INTRA_ANGULAR80.

Meanwhile, the intra prediction technique information may be implemented in various forms. For example, the intra prediction technique information may include intra prediction type index information specifying one of a plurality of intra prediction techniques. As another example, the intra prediction technique information may include at least one of reference sample line information (e.g., intra_luma_ref_idx) indicating whether to apply MRL to the current block and, if applied, which reference sample line is used, ISP flag information (e.g., intra_subpartitions_mode_flag) indicating whether to apply ISP to the current block, ISP type information (e.g., intra_subpartitions_split_flag) specifying the split type of sub-partitions when applying ISP, flag information specifying whether to apply PDPC, or flag information specifying whether to apply LIP. In the present disclosure, ISP flag information may be referred to as an ISP application indicator.

The intra prediction mode information and/or the intra prediction technique information may be encoded/decoded through the coding method described in the present disclosure. For example, the intra prediction mode information and/or the intra prediction technique information may be encoded/decoded through entropy coding (e.g., CABAC, CAVLC) based on a truncated (rice) binary code.

Hereinafter, a chroma format and intra prediction of a chroma component block will be described.

Overview of Chroma Format

Figure 16A:
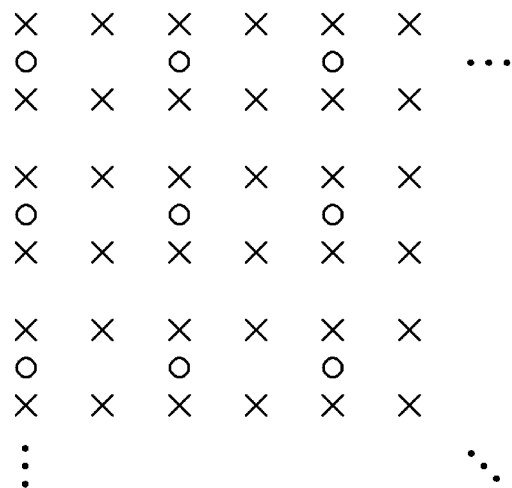
FIGS. 16A to 16C are views illustrating a relationship between a luma component block (luma component array) and a chroma component block (chroma component array) according to a chroma format.
Figure 16B:
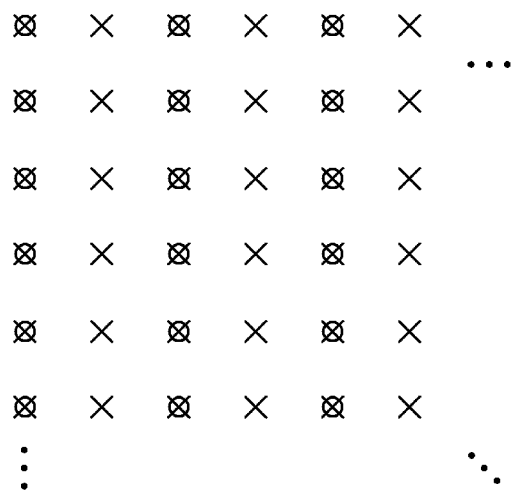
Figure 16C:
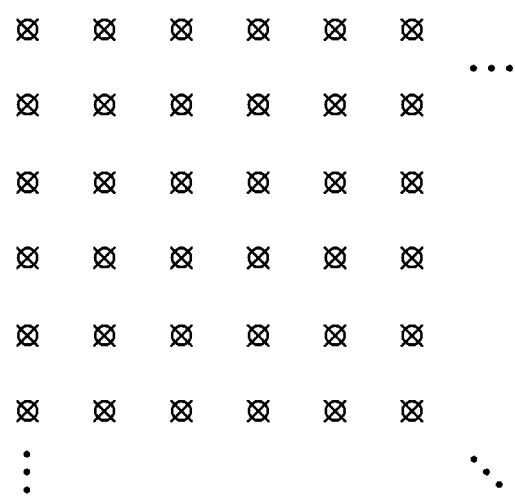

FIGS. 16A to 16C are views illustrating a relationship between a luma component block (luma component array) and a chroma component block (chroma component array) according to a chroma format.

A source or coded picture/image may include a luma component (Y) block and two chroma component (cb, cr) blocks. That is, one pixel of the picture/image may include a luma sample and two chroma samples (cb, cr). A color format may represent a configuration format of a luma sample and chroma samples (cb, cr), and may be referred to as a chroma format. The chroma format may be predefined or may be adaptively signaled. For example, the chroma format may be signaled based on at least one of chroma_format_idc or separate_colour_plane_flag as shown in Table 3.

TABLE 3

| chroma_format_idc | separate_colour_plane_flag | ChromaArrayType | Chroma format | SubWidthC | SubHeightC |
|---|---|---|---|---|---|
| 0 | 0 | 0 | Monochrome | 1 | 1 |
| 1 | 0 | 1 | 4:2:0 | 2 | 2 |
| 2 | 0 | 2 | 4:2:2 | 2 | 1 |
| 3 | 0 | 3 | 4:4:4 | 1 | 1 |
| 3 | 1 | 0 | 4:4:4 | 1 | 1 |

In Table 3 above, chroma_format_idc may specify the format of a luma sample and a chroma sample corresponding thereto, and separate_colour_plane_flag may specify whether three color components Y, cb and cr are separately encoded in a 4:4:4 chroma format.

When chroma_format_idc is 0, the chroma format corresponds to a monochrome format, and the current block does not include the chroma component block and may include only the luma component block.

Alternatively, when chroma_format_idc is 1, the chroma format may correspond to a 4:2:0 chroma format, and the width and height of the chroma component block may respectively correspond to half the width and half the height of the luma component block. FIG. 9a shows the location relationship between the luma sample and the chroma sample in a 4:2:0 chroma format.

Alternatively, when chroma_format_idc is 2, the chroma format may correspond to a 4:2:2 chroma format, the width of the chroma component block may respectively correspond to half the width of the luma component block, and the height of the chroma component block may be equal to that of the luma component block. FIG. 9b shows the location relationship between the luma sample and the chroma sample in a 4:2:2 chroma format.

Alternatively, when chroma_format_idc is 3, the chroma format may correspond to a 4:4:4 chroma format, and the width and height of the chroma component block may respectively correspond to the width and height of the luma component block. FIGS. 16A to 16C shows the location relationship between the luma sample and the chroma sample in a 4:4:4 chroma format.

SubWidthC and SubHeightC represent a ratio of the luma sample and the chroma sample. For example, when the width and height of the luma component block are respectively CbWidth and CbHeight, the width and height of the chroma component block may be derived as (CbWidth/SubwidthC) and (CbHeight/SubHeightC), respectively.

Minimum Size Limit of Chroma Block

In an image encoding/decoding process, a size of a chroma block may have a great effect on throughput. For example, when a chroma block having a predetermined size or less is excessively generated, throughput of the image encoding/decoding process may significantly deteriorate. In order to solve such a problem, CU splitting may be limited not to generate a chroma block having a predetermined size or less.

Specifically, in a dual tree structure, block splitting of a luma block or a chroma block may be limited not to generate a 2×2, 2×4 or 4×2 chroma block. For example, in a dual tree structure, quadtree splitting and/or binary splitting for a 2×8, 4×4 or 8×2 chroma block may be limited. In addition, in a dual tree structure, ternary splitting for a 2×8, 2×16, 4×4, 4×8, 8×2 or 8×4 chroma block may be limited.

In a single tree structure, the split structure of a current block may be switched from a single tree structure to a dual tree structure according to a smallest chroma intra prediction unit (SCIPU) limit. For example, a chroma block may be limited to include at least 16 samples according to the SCIPU limit. Therefore, due to block splitting, when a 2×2, 2×4 or 4×2 chroma block is generated, block splitting of the chroma block is prohibited and block splitting may be performed only on the luma block. The split structure of the current block switched from the single tree structure to the dual tree structure may be referred to as a local dual tree structure.

FIGS. 17A to 17C are views illustrating an example of syntax for switching a single tree structure to a dual tree structure. FIGS. 17A to 17C illustrate syntax of one coding_tree, which is divided into three drawings for convenience.

Referring to FIGS. 17A to 17C, a prediction mode type of each of CUs generated from the current CTU may be determined based on the value of a parameter modeTypeCondition in the coding_tree syntax. Here, modeTypeCondition may specify the prediction mode characteristics of each of the CUs. In addition, modeType may specify the prediction mode type of each of the CUs. In an example, modeType may have a value of any one of MODE_TYPE_ALL specifying that all prediction modes such as intra prediction, IBC, palette mode, inter prediction, etc. are available, MODE_TYPE_INTRA specifying that only intra prediction, IBC and palette modes are available, and MODE_TYPE_INTER specifying that only an inter prediction mode is available.

modeTypeCondition of the current CU may have any one of a first value (e.g., 0) to a third value (e.g., 2) according to predetermined conditions. In addition, modeType may be determined based on a value of modeTypeCondition.

Specifically, referring to FIG. 17A, when modeTypeCondition has a second value (e.g., 1) (1710), modeType may be determined to be MODE_TYPE_INTRA (1720).

Alternatively, when modeTypeCondition has a third value (e.g., 2) (1730), modeType may be determined based on a value of mode_constraint_flag. Here, mode_constraint_flag may specify whether an inter prediction mode applies to a current CU. For example, a first value (e.g., 0) of mode_constraint_flag may specify that only an inter prediction mode applies to the current CU. In addition, in this case, modeType of the current CU may be determined to be MODE_TYPE_INTER. A second value (e.g., 1) of mode_constraint_flag may specify that the inter prediction mode may not apply to the current CU. In addition, in this case, modeType may be determined to be MODE_TYPE_INTRA (1740).

Alternatively, when modeTypeCondition has a value other than a second value (e.g., 1) and a third value (e.g., 2) (for example, when modeTypeCondition has a first value (e.g., 0)), modeType may be determined to be the same value as modeTypeCurr (1750). Here, modeTypeCurr is a call input value of coding_tree syntax, and may mean a prediction mode type of a current CU. In an example, when the current CU is a root node of a split tree, modeTypeCurr may be MODE_TYPE_ALL.

modeType determined based on the value of modeTypeCondition may be used as a call input value of the coding_tree syntax for calling a lower-layer CU obtained by splitting the current CU.

In addition, based on the value of modeType of the current CU, the split structure treeType of the lower-layer CU generated by splitting the current CU may be determined (1760). For example, when modeType of the current CU is MODE_TYPE_INTRA, the split structure of the lower-layer CU may be determined to be dual tree luma DUAL_TREE_LUMA. In contrast, when modeType is not MODE_TYPE_INTRA, the split structure of the lower-layer CU may be the split structure treeTypeCurr of the current CU.

Information on the split structure of the lower-layer CU may be stored in a parameter treeType. treeType and modeType may be used as an input value of the coding_tree syntax for calling lower-layer CUs by additionally splitting the current CU.

When modeType of the lower-layer CU is MODE_TYPE_INTRA, the current CU may be additionally split to have a dual tree structure. Specifically, referring to FIG. 17B, when modeType of the lower-layer CU is MODE_TYPE_INTRA, the lower-layer CU may have a tree structure of dual tree luma DUAL_TREE_LUMA. That is, the luma component and chroma component of the current CU may be split to have separate tree structures. (1770). In addition, referring to FIG. 17C, when modeTypeCurr of the current CU is MODE_TYPE_ALL and modeType of the lower-layer CU is MODE_TYPE_INTRA, the chroma component of the current CU is not split and the lower-layer CU may have a tree structure of dual tree chroma DUAL_TREE_CHROMA (1780).

As such, modeType of the lower-layer CU may be determined based on modeTypeCondition. In addition, when modeType of the lower-layer CU is MODE_TYPE_INTRA, the luma component of the lower-layer CU has a tree structure of dual tree luma and the chroma component of the lower-layer CU may have a tree structure of dual tree chroma. That is, the lower-layer CU partially has a dual tree structure within the current CTU, and such a split structure may be referred to as a local dual tree structure.

FIG. 18 is a view illustrating an example of a process of deriving prediction mode characteristic information.

Referring to FIG. 18, modeTypeCondition which is the prediction mode characteristic information may have a first value (e.g., 0) to a third value (e.g., 2) based on Conditions 1 to 3 below.

Specifically, when at least one of Condition 1-1 or Condition 1-2 which is a subcondition of Condition 1 is satisfied, modeTypeCondition may have a first value (e.g., 0).

Here, Condition 1-1 may mean that a current CU is included in an I slice, each CTU included in the corresponding slice is implicitly quadtree-split into 64×64 luma sample CUs, and the 64×64 luma sample CU is a root node of a dual tree.

Condition 1-2 may mean that modeTypeCurr is not MODE_TYPE_ALL.

When Condition 1 above is not satisfied and at least one of Conditions 2-1 to 2-3 which are subconditions of Condition 2 is satisfied, modeTypeCondition may have a second value (e.g., 1).

Here, Condition 2-1 may mean that a product of the width and height of the current CU is 64 and a split mode of the current CU is a quadtree split mode.

Condition 2-2 may mean that a product of the width and height of the current CU is 64 and a split mode of the current CU is a horizontal ternary split mode or vertical ternary split mode.

Condition 2-3 may mean that a product of the width and height of the current CU is 32 and a split mode of the current CU is a horizontal binary split mode or vertical binary split mode.

When both Condition 1 and Condition 2 above are not satisfied and at least one of Condition 3-1 or Condition 3-2 which is a subcondition of Condition 3 is satisfied, modeTypeCondition may have a second value (e.g., 1) or a third value (e.g., 2) depending on whether the current CU is included in an I slice. For example, as the case where at least one of Condition 3-1 or Condition 3-2 is satisfied, when the current CU is included in an I slice, modeTypeCondition may have a second value and, when the current CU is not included in an I slice, modeTypeCondition may have a third value.

Here, Condition 3-1 may mean the case where a product of the width and height of the current CU is 64 and the split mode of the current CU is a horizontal binary split mode or a vertical binary split mode.

Condition 3-2 may mean the case where a product of the width and height of the current CU is 128 and the split mode of the current CU is a horizontal ternary split mode or a vertical ternary split mode.

Meanwhile, when all Conditions 1 to 3 above are not satisfied, modeTypeCondition may have a first value (e.g., 0).

In Conditions 1 to 3, the current CU may mean the luma block of the current CU. That is, the value of modeTypeCondition may be determined based on the size of the luma block of the current CU. In this case, the size of the chroma block of the current CU may be determined according to the color format (chroma format) of the current CU described with reference to Table 3 and the size of the luma block of the current CU.

Based on the value of modeTypeCondition determined according to Conditions 1 to 3, a prediction mode type of a lower-layer CU obtained by splitting the current CU may be determined. For example, when modeTypeCondition has a first value (e.g., 0), the prediction mode type modeType of the lower-layer CU may be determined to be a prediction mode type modeTypeCurr of the current CU. Alternatively, when modeTypeCondition has a second value (e.g., 1), modeType may be determined to be MODE_TYPE_INTRA. Alternatively, when modeTypeCondition has a third value (e.g., 2), modeType may be determined to be MODE_TYPE_INTER or MODE_TYPE_INTRA based on the value of mode_constraint_flag.

Based on the value of each of modeTypeCurr and modeType determined through the above-described method, whether to split the chroma block of the current CU may be determined. For example, when modeTypeCurr is MODE_TYPE_ALL and modeType is MODE_TYPE_INTRA, splitting of the chroma block of the current CU may be prohibited. However, in this case, since the value of modeTypeCondition is determined based on the size of the luma block of the current CU, even though the minimum size limit (e.g., at least 16 chroma samples) of the chroma block is not violated, splitting of the chroma block of the current CU may be prohibited. This will be described in detail with reference to FIGS. 19A to 21.

Figure 19B:
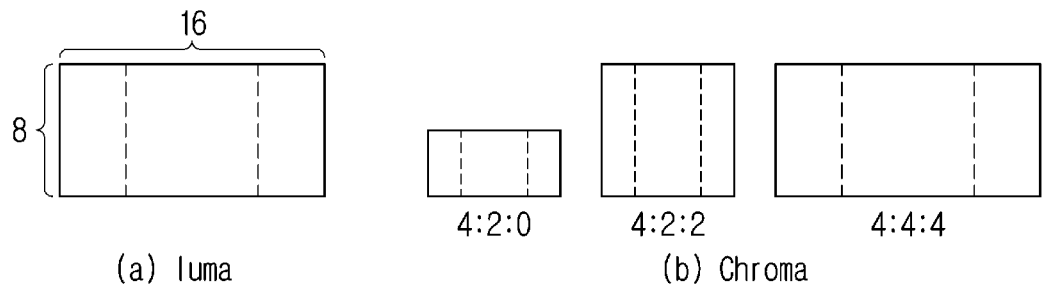

FIGS. 19A and 19B are views illustrating an example of lower-layer CUs obtained by ternary-splitting a current CU for each color format.

FIG. 19A shows the case where the current CU including a 4×32 luma block having a product of a width and a height of 128 is horizontal-ternary-split, as in Condition 3-2 above.

Referring to FIG. 19A, in a 4:2:0 color format, lower-layer CUs obtained by horizontal-ternary-splitting the current CU may include 2×4 chroma blocks. In this case, based on Condition 3-2 and the value of mode_constraint_flag specifying whether the current CU is intra-encoded without additional splitting, horizontal ternary splitting of the current CU may be prohibited. For example, as described above, when mode_constraint_flag has a second value (e.g., 1), modeType of the lower-layer CU may be determined to be MODE_TYPE_INTRA, and horizontal ternary splitting of the chroma block of the current CU may be prohibited.

In contrast, in a 4:2:2 or 4:4:4 color format, lower-layer CUs obtained by horizontal-ternary-splitting the current CU may not include a 2×2, 2×4 or 4×2 chroma block. However, even in this case, based on Condition 3-2 and the value of mode_constraint_flag, modeType of the lower-layer CU may be determined to be MODE_TYPE_INTRA, and horizontal-ternary splitting of the chroma block of the current CU may be prohibited.

Next, FIG. 19B shows the case where the current CU including a 16×8 luma block having a product of a width and a height of 128 is vertical-ternary-split, as in Condition 3-2 above.

Referring to FIG. 19B, in a 4:2:0 color format, lower-layer CUs obtained by vertical-ternary-splitting the current CU may include 2×4 chroma blocks. In this case, based on Condition 3-2 and the value of mode_constraint_flag, vertical ternary splitting of the chroma block of the current CU may be prohibited.

In contrast, in a 4:2:2 or 4:4:4 color format, lower-layer CUs obtained by vertical-ternary-splitting the current CU may not include a 2×2, 2×4 or 4×2 chroma block. However, even in this case, based on Condition 3-2 and the value of mode_constraint_flag, modeType of the lower-layer CU may be determined to be MODE_TYPE_INTRA, and vertical-ternary splitting of the chroma block of the current CU may be prohibited.

Figure 20A:
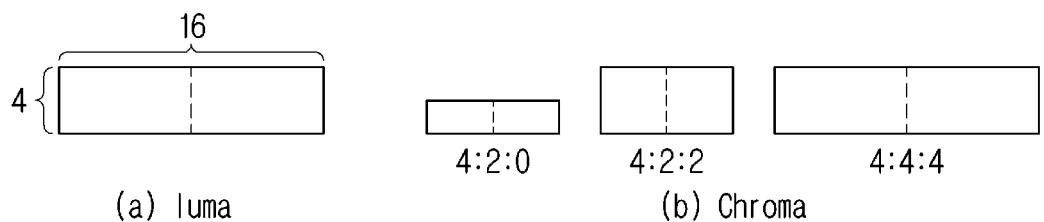
FIGS. 20A and 20B are views illustrating an example of lower-layer CUs obtained by vertical-binary-splitting a current CU for each color format.
Figure 20B:
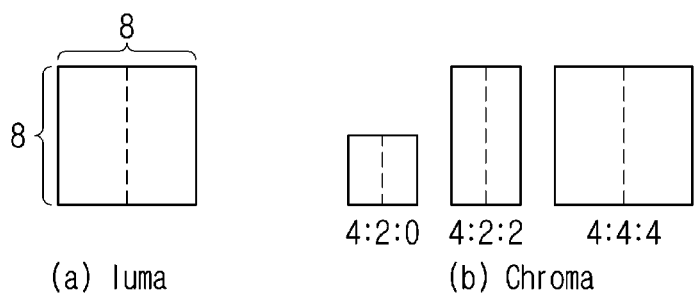

FIGS. 20A and 20B are views illustrating an example of lower-layer CUs obtained by vertical-binary-splitting a current CU for each color format.

FIG. 20A shows the case where the current CU including a 4×16 luma block having a product of a width and a height of 64 is vertical-binary-split, as in Condition 3-1 above.

Referring to FIG. 20A, in a 4:2:0 color format, lower-layer CUs obtained by vertical-binary-splitting the current CU may include 4×2 chroma blocks. In this case, based on Condition 3-1 and the value of mode_constraint_flag specifying whether the current CU is intra-encoded without additional splitting, vertical-binary splitting of the current CU may be prohibited. For example, as described above, when mode_constraint_flag has a second value (e.g., 1), modeType of the lower-layer CU may be determined to be MODE_TYPE_INTRA, and vertical binary splitting of the chroma block of the current CU may be prohibited.

In contrast, in a 4:2:2 or 4:4:4 color format, lower-layer CUs obtained by vertical-binary-splitting the current CU may not include a 2×2, 2×4 or 4×2 chroma block. However, even in this case, based on Condition 3-1 and the value of mode_constraint_flag, modeType of the lower-layer CU may be determined to be MODE_TYPE_INTRA, and vertical binary splitting of the chroma block of the current CU may be prohibited.

Next, FIG. 20B shows the case where the current CU including an 8×8 luma block having a product of a width and a height of 64 is vertical-binary-split, as in Condition 3-1 above.

Referring to FIG. 20B, in a 4:2:0 color format, lower-layer CUs obtained by vertical-binary-splitting the current CU may include 2×4 chroma blocks. In this case, based on Condition 3-2 and the value of mode_constraint_flag, modeType of the lower-layer CU may be determined to be MODE_TYPE_INTRA, and vertical binary splitting of the chroma block of the current CU may be prohibited.

In contrast, in a 4:2:2 or 4:4:4 color format, lower-layer CUs obtained by vertical-binary-splitting the current CU may not include a 2×2, 2×4 or 4×2 chroma block. However, even in this case, based on Condition 3-1 and the value of mode_constraint_flag, modeType of the lower-layer CU may be determined to be MODE_TYPE_INTRA, and vertical binary splitting of the chroma block of the current CU may be prohibited.

Figure 21:
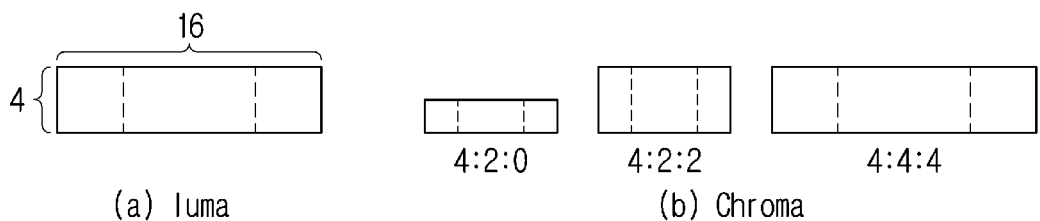
FIG. 21 is a view illustrating an example of lower-layer CUs obtained by vertical-ternary-splitting a current CU for each color format.

FIG. 21 is a view illustrating an example of lower-layer CUs obtained by vertical-ternary-splitting a current CU for each color format.

FIG. 21 shows the case where the current CU including a 16×4 luma block having a product of a width and a height of 64 is vertical-ternary-split, as in Condition 3-1 above.

Referring to FIG. 21a, in a 4:2:0 color format, lower-layer CUs obtained by vertical-ternary-splitting the current CU may include 2×2 chroma blocks. In this case, in an example, in order to limit a 2×2 chroma block, modeTypeCondition may be inferred as having a second value (e.g., 1) regardless of the value of mode_constraint_flag. As a result, mode_constraint_flag may not be signaled. Therefore, modeType of the lower-layer CU may be determined to be MODE_TYPE_INTRA, and vertical ternary splitting of the chroma block of the current CU may be prohibited.

In contrast, in a 4:2:2 or 4:4:4 color format, lower-layer CUs obtained by vertical-ternary-splitting the current CU may not include a 2×2 chroma block. However, even in this case, modeTypeCondition may be inferred as having a second value (e.g., 1) based on Condition 3-1 above, and vertical-ternary splitting of the chroma block of the current CU may be prohibited.

According to Conditions 1 to 3 of FIG. 18, in a 4:2:0 color format, additional splitting of the chroma block may be prohibited according to minimum size limit of the chroma block. However, in a 4:2:2 or 4:4:4 color format, additional splitting of the chroma block may be prohibited even though the minimum size limit of the chroma block is not violated.

In order to solve such a problem, according to the embodiments of the present disclosure, the value of modeTypeCondition may be determined based on the color format of the current CU and the size of the chroma block of the current CU.

Hereinafter, embodiments of the present disclosure will be described in detail with reference to the accompanying drawings.

Process of Deriving Prediction Mode Characteristic Information

FIG. 22 is a view illustrating a process of deriving prediction mode characteristic information according to an embodiment of the present disclosure.

When the color format of the current CU is a monochrome format or a 4:4:4 format and each of color components (e.g., Y, Cb, Cr) is separably encoded, the luma block and the chroma block within the current CU may not simultaneously exist. As a result, it is impossible to limit splitting of the chroma block based on the size of the luma block.

In addition, as described above with reference to FIGS. 19A to 21, according to the color format of the current CU, even though minimum size limit of the chroma block is not violated, splitting of the chroma block of the current block may be prohibited.

In order to solve such problems, a process of deriving prediction mode characteristic information modeTypeCondition according to an embodiment of the present disclosure may be performed based on the color format of the current CU, unlike the example of FIG. 18.

Referring to FIG. 22, modeTypeCondition may have a first value (e.g., 0) to a third value (e.g., 2) based Conditions 4 to 6 below.

Specifically, when at least one of Conditions 4-1 to 4-4 which are subconditions of Condition 4 are satisfied, modeTypeCondition may have a first value (e.g., 0).

Here, Condition 4-1 may mean that the current CU is included in an I slice, each CTU included in the corresponding slice is implicitly quadtree-split into 64×64 luma sample CUs, and the 64×64 luma sample CU is a root node of a dual tree.

Condition 4-2 may mean that modeTypeCurr is not MODE_TYPE_ALL.

Condition 4-3 may mean that each color component of the current CU is separately encoded (separate_colour_plane_flag=1). In another example, Condition 4-3 may mean that the color format of the current CU is a 4:4:4 format (chroma_format_idc=3).

Condition 4-4 may mean that the color format of the current CU is a monochrome format (chroma_format_idc=0).

When Condition 4 above is not satisfied and at least one of Condition 5-1 or 5-2 which is a subcondition of Condition 5 are not satisfied, modeTypeCondition may have a second value (e.g., 1).

Here, Condition 5-1 may mean that a product of the width and height of the chroma block of the current CU is 16, and the split mode of the current CU is a quadtree split mode. When the color format of the current CU is a 4:2:0 format, Condition 5-1 may mean that a product of the width and height of the luma block of the current CU is 64 and the split mode of the current CU is a quadtree split mode. Alternatively, when the color format of the current CU is a 4:2:2 format, Condition 5-1 may mean that a product of the width and height of the luma block of the current CU is 32, and the split mode of the current CU is a quadtree split mode.

Condition 5-2 may mean that a product of the width and height of the chroma block of the current CU is 16 and the split mode of the current CU is a horizontal ternary split mode or a vertical ternary split mode. When the color format of the current CU is a 4:2:0 format, Condition 5-2 may mean that a product of the width and height of the luma block of the current CU is 64 and the split mode of the current CU is a horizontal ternary split mode or a vertical ternary split mode. Alternatively, when the color format of the current CU is a 4:2:2 format, Condition 5-2 may mean that a product of the width and height of the luma block of the current CU is 32 and the split mode of the current CU is a horizontal ternary split mode or a vertical ternary split mode.

When both Conditions 4 and 5 above are not satisfied and at least one of Condition 6-1 or 6-2 which is a subcondition of Condition 6 are satisfied, modeTypeCondition may have a second value (e.g., 1) or a third value (e.g., 2) depending on whether the current CU is included in an I slice For example, as the case where at least one of Condition 6-1 or 6-2 is satisfied, when the current CU is included in an I slice, modeTypeCondition may have a second value, and, when the current CU is not included in an I slice, modeTypeCondition may have a third value.

Here, Condition 6-1 may mean that a product of the width and height of the chroma block of the current CU is 16 and the split mode of the current CU is a horizontal binary split mode or a vertical binary split mode. When the color format of the current CU is a 4:2:0 format, Condition 6-1 may mean that a product of the width and height of the luma block of the current CU is 64, and the split mode of the current CU is a horizontal binary split mode or a vertical binary split mode. Alternatively, when the color format of the current CU is a 4:2:2 format, Condition 6-1 may mean that a product of the width and height of the luma block of the current CU is 32 and the split mode of the current CU is a horizontal binary split mode or a vertical binary split mode.

Condition 6-2 may mean the case where a product of the width and height of the chroma block of the current CU is 32 and the split mode of the current CU is a horizontal ternary split mode or vertical ternary split mode. When the color format of the current CU is a 4:2:0 format, Condition 6-2 may mean that the case where a product of the width and height of the luma block of the current CU is 128 and the split mode of the current CU is a horizontal ternary split mode or vertical ternary split mode. Alternatively, when the color format of the current CU is a 4:2:2 format, Condition 6-2 may mean the case where a product of the width and height of the luma block of the current CU is 64 and the split mode of the current CU is a horizontal ternary split mode or vertical ternary split mode.

In an example, Condition 6 may further include the case where, as the subcondition, the width of the chroma block of the current CU is 4 and the split mode of the current CU is a vertical binary split mode. When the color format of the current CU is a 4:2:0 format or 4:2:2 format, the subcondition may mean the case where the width of the luma block of the current CU is 8 and the split mode of the current CU is a vertical binary split mode. In addition, in an example, Condition 6 may further include, as the subcondition, the case where the width of the chroma block of the current CU is 8 and the split mode of the current CU is a vertical ternary split mode. When the color format of the current CU is a 4:2:0 format or 4:2:2 format, the subcondition may mean the case where the width of the luma block of the current CU is 16 and the split mode of the current CU is a vertical ternary split mode.

Meanwhile, when all Conditions 4 to 6 above are not satisfied, modeTypeCondition may have a first value (e.g., 0).

In Conditions 5 and 6, the width and height of the chroma block may be derived using a ratio of the luma block and the chroma block determined according to the color format of the current CU as described above with reference to Table 3. For example, in the monochrome format, a ratio SubWidthC of the width of the luma block and the width of the chroma block may be 1 and a ratio of the height of the luma block and the height of the chroma block may be 1. In addition, in a 4:2:0 format, SubWidthC may be 2 and SubHeightC may be 2. In addition, in a 4:4:4 format, SubWidthC may be 2 and SubHeightC may be 1. In addition, in a 4:4:4 format, SubWidthC may be 1 and SubHeightC may be 1. In each color format, the width of the chroma block may be derived by dividing the width cbWidth of the luma block by SubWidthC, and the height of the chroma block may be derived by dividing the height cbHeight of the luma block by SubWidthH.

Based on the value of modeTypeCondition determined according to Conditions 4 to 6, the prediction mode type modeType of the lower-layer CU obtained by splitting the current CU may be determined. For example, when modeTypeCondition has a first value (e.g., 0), modeType may be determined to be the prediction mode type modeTypeCurr of the current CU. Alternatively, when modeTypeCondition has a second value (e.g., 1), modeType may be determined to be MODE_TYPE_INTRA. Alternatively, when modeTypeCondition has a third value (e.g., 2), modeType may be determined to be MODE_TYPE_INTER or MODE_TYPE_INTRA based on the value of mode_constraint_flag.

Based on the value of each of modeTypeCurr and modeType determined through the above-described method, whether to split the chroma block of the current CU may be determined. For example, when modeTypeCurr is MODE_TYPE_ALL and modeType is MODE_TYPE_INTRA, splitting of the chroma block of the current CU may be prohibited.

According to an embodiment of the present disclosure, prediction mode characteristic information modeTypeCondition may be derived based on the color format of the current CU. Therefore, in a 4:2:2 format or 4:4:4 format, even though the minimum size limit of the chroma format is not prohibited, it is possible to prevent additional splitting of the chroma format of the current CU from being prohibited.

Hereinafter, a method of encoding/decoding an image based on prediction mode characteristic information modeTypeCondition derived according to the embodiment of FIG. 22 will be described in detail.

Image Encoding Method

Figure 23:
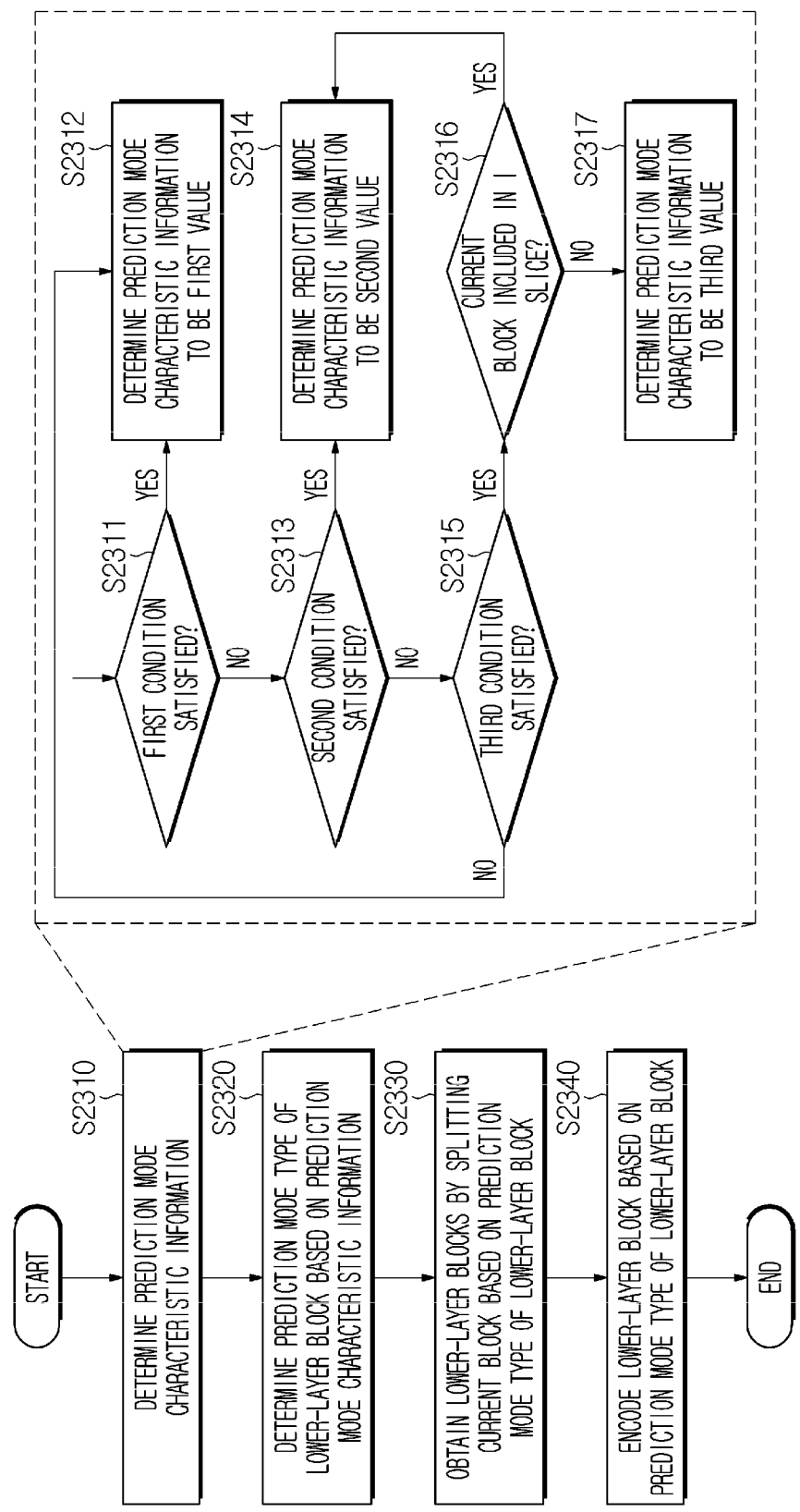
FIG. 23 is a flowchart illustrating an image encoding method according to an embodiment of the present disclosure.

FIG. 23 is a flowchart illustrating an image encoding method according to an embodiment of the present disclosure. The image encoding method of FIG. 23 may be performed by the image encoding apparatus of FIG. 2. For example, steps S2310 to S2330 may be performed by the image partitioner 110, and step S2340 may be performed by the inter prediction unit 180 or the intra prediction unit 185.

Referring to FIG. 23, the image encoding apparatus may determine prediction mode characteristic information modeTypeCondition (S2310). In an example, the prediction mode characteristic information may be determined based on the color format of the current block.

Specifically, the image encoding apparatus may determine whether a first condition is satisfied (S2311). In an example, the first condition may include the case where the color format of the current block is a monochrome format or 4:4:4 format. In addition, the first condition may include the case where each color component of the current block is separately encoded (separate_colour_plane_flag=1). In addition, the first condition may include the case where a current block is included in an I slice, each block included in the corresponding slice is implicitly quadtree-split into 64×64 luma sample CUs, and the 64×64 luma sample CU is a root node of a dual tree. In addition, the first condition may include the case where the prediction mode type modeType-Curr of the current block is not a first prediction mode type MODE_TYPE_ALL. Here, the first prediction mode type MODE_TYPE_ALL may specify a prediction mode type in which both an intra prediction mode and an inter prediction mode are available.

When the first condition is satisfied ('YES' of S2311), the prediction mode characteristic information may be determined to be a first value (e.g., 0) (S2312).

In contrast, when the first condition is not satisfied (for example, when the color format of the current block is a 4:2:0 or 4:2:2 format)('NO' of S2311), the image encoding apparatus may determine whether a second condition is satisfied (S2313). In an example, the second condition may include the case where a product of the width and height of the chroma block of the current block is 16 and the split mode of the current block is a quadtree split mode. In addition, the second condition may include the case where a product of the width and height of the chroma block of the current block is 16 and the split mode of the current block is a horizontal ternary split mode or vertical ternary split mode. In an example, the second condition may be changed according to the size of the luma block of the current block based on the color format of the current block, as described above with reference to FIG. 22.

When the second condition is satisfied ('YES' of S2313), the prediction mode characteristic information may be determined to be a second value (e.g., 1) (S2314).

In contrast, when the second condition is not satisfied ('NO' of S2313), the image encoding apparatus may determine whether a third condition is satisfied (S2315). In an example, the third condition may include the case where a product of the width and height of the chroma block of the current block is 16 and the split mode of the current block is a horizontal binary split mode or vertical binary split mode. In addition, the second condition may include the case where a product of the width and height of the chroma block of the current block is 32 and the split mode of the current block is a horizontal ternary split mode or vertical ternary split mode. In an example, the third condition may be changed according to the size of the luma block of the current block based on the color format of the current block, as described above with reference to FIG. 22.

When the third condition is satisfied ('YES' of S2315), the image encoding apparatus may determine whether the current block is included in an I slice (S2316).

When the current block is included in the I slice ('YES' of S2316), the prediction mode characteristic information may be determined to be a second value (e.g., 1) (S2314). In contrast, when the current block is not included in the I slice ('NO' of S2316), the prediction mode characteristic information may be determined to be a third value (e.g., 2) (S2317).

In contrast, when the third condition is not satisfied ('NO' of S2315), the prediction mode characteristic information may be determined to be a first value (e.g., 0) (S2312).

The image encoding apparatus may determine the prediction mode type modeType of the lower-layer block obtained by splitting the current block, based on the prediction mode characteristic information (S2320).

For example, when the prediction mode characteristic information has a first value (e.g., 0), the prediction mode type of the lower-layer block may be determined to be a prediction mode type modeTypeCurr of the current block.

Alternatively, when the prediction mode characteristic information has a second value (e.g., 1), the prediction mode type of the lower-layer block may be determined to be a second prediction mode type MODE_TYPE_INTRA. Here, the second prediction mode type MODE_TYPE_INTRA may specify a prediction mode type in which only intra prediction is available.

Alternatively, when the prediction mode characteristic information has a third value (e.g., 2), it may be determined to be a second prediction mode type MODE_TYPE_INTRA or a third prediction mode type MODE_TYPE_INTER according to a predetermined condition. For example, when only an inter prediction mode is available, the prediction mode type of the lower-layer block may be determined to be a third prediction mode type MODE_TYPE_INTER. Here, the third prediction mode type MODE_TYPE_INTER may specify a prediction mode type in which only inter prediction is available. In contrast, when the inter prediction mode is not available, the prediction mode type of the lower-layer block may be determined to be the second prediction mode type MODE_TYPE_INTRA. In an example, information specifying whether the inter prediction mode is available may be encoded using a predetermined flag (e.g., mode_constraint_flag).

The image encoding apparatus may obtain the lower-layer block of the current block by splitting the current block based on the prediction mode type of the lower-layer block (S2330). For example, when the prediction mode type of the lower-layer block is the second prediction mode type MODE_TYPE_INTRA, the image encoding apparatus may obtain the lower-layer block by splitting the current block to have a dual tree structure. In contrast, when the prediction mode type of the current block is not the second prediction mode type MODE_TYPE_INTRA (for example, when the prediction mode type of the current block is a first prediction mode type MODE_TYPE_ALL or a third prediction mode type MODE_TYPE_INTER), the image encoding apparatus may obtain the lower-layer block by splitting the current block according to the split structure of the current block. For example, when the split structure of the current block is a single tree structure, the image encoding apparatus may obtain the lower-layer block by splitting the current block to have a single tree structure. Alternatively, when the split structure of the current block is a dual tree structure, the image encoding apparatus may obtain the lower-layer block by splitting the current block to have a dual tree structure.

The split structure of the lower-layer block is determined to be a dual tree structure, whether to split the luma block and chroma block of the current block may be independently determined. For example, whether to split the luma block may be determined based on the size of the luma block. In addition, whether to split the chroma block may be determined based on the size of the chroma block. In an example, whether to split the chroma block may be determined based on the color format of the current block as described above with reference to FIG. 22.

The image encoding apparatus may encode the lower-layer block based on the prediction mode type of the lower-layer block (S2340). For example, when the prediction mode type of the lower-layer block is a first prediction mode type MODE_TYPE_ALL, the image encoding apparatus may encode the lower-layer block based on one of an intra prediction mode, IBC, a palette mode and an inter prediction mode. In this case, information specifying the prediction mode applying to the lower-layer block may be encoded using a predetermined flag (e.g., pred_mode_flag).

Alternatively, when the prediction mode type of the lower-layer block is the second prediction mode type MODE_TYPE_INTRA, the image encoding apparatus may encode the lower-layer block based on an intra prediction mode.

Alternatively, when the prediction mode type of the lower-layer block is the third prediction mode type MODE_TYPE_INTER, the image encoding apparatus may encode the lower-layer block based on the inter prediction mode.

According to the image encoding method according to an embodiment of the present disclosure, by determining the split mode of the lower-layer block based on a at least one of the color format, split mode or size of the current block, it is possible to more improve encoding efficiency without violating the minimum size limit of the chroma block.

Image Decoding Method

Figure 24:
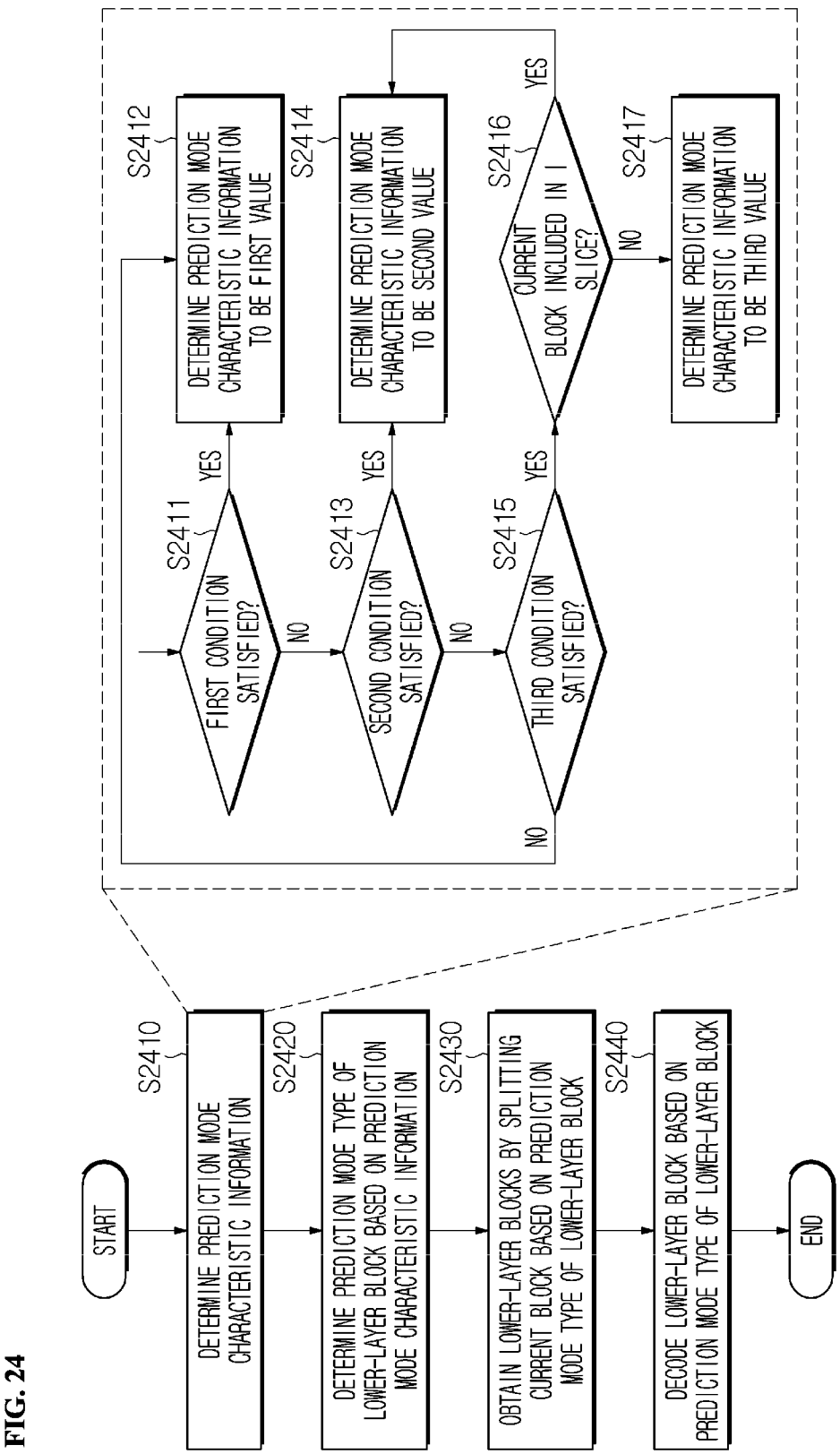
FIG. 24 is a flowchart illustrating an image decoding method according to an embodiment of the present disclosure.

FIG. 24 is a flowchart illustrating an image decoding method according to an embodiment of the present disclosure. The image decoding method of FIG. 24 may be performed by the image decoding apparatus of FIG. 3. For example, steps S2410 to S2430 may be performed by the processor, and step S2440 may be performed by the inter prediction unit 260 or the intra prediction unit 265.

Referring to FIG. 24, the image decoding apparatus may determine prediction mode characteristic information modeTypeCondition (S2410). In an example, the prediction mode characteristic information may be determined based on the color format of the current block.

Specifically, the image decoding apparatus may determine whether a first condition is satisfied (S2411). In an example, the first condition may include the case where the color format of the current block is a monochrome format or 4:4:4 format. In addition, the first condition may include the case where each color component of the current block is separately encoded (separate_colour_plane_flag=1). In addition, the first condition may include the case where a current block is included in an I slice, each block included in the corresponding slice is implicitly quadtree-split into 64×64 luma sample CUs, and the 64×64 luma sample CU is a root node of a dual tree. In addition, the first condition may include the case where the prediction mode type modeTypeCurr of the current block is not a first prediction mode type MODE_TYPE_ALL.

When the first condition is satisfied ('YES' of S2411), the prediction mode characteristic information may be determined to be a first value (e.g., 0) (S2412).

In contrast, when the first condition is not satisfied (for example, when the color format of the current block is a 4:2:0 or 4:2:2 format)('NO' of S2411), the image decoding apparatus may determine whether a second condition is satisfied (S2313). In an example, the second condition may include the case where a product of the width and height of the chroma block of the current block is 16 and the split mode of the current block is a quadtree split mode. In addition, the second condition may include the case where a product of the width and height of the chroma block of the current block is 16 and the split mode of the current block is a horizontal ternary split mode or vertical ternary split mode. In an example, the second condition may be changed according to the size of the luma block of the current block based on the color format of the current block, as described above with reference to FIG. 22.

When the second condition is satisfied ('YES' of S2413), the prediction mode characteristic information may be determined to be a second value (e.g., 1) (S2414).

In contrast, when the second condition is not satisfied ('NO' of S2413), the image decoding apparatus may determine whether a third condition is satisfied (S2415). In an example, the third condition may include the case where a product of the width and height of the chroma block of the current block is 16 and the split mode of the current block is a horizontal binary split mode or vertical binary split mode. In addition, the second condition may include the case where a product of the width and height of the chroma block of the current block is 32 and the split mode of the current block is a horizontal ternary split mode or vertical ternary split mode. In an example, the third condition may be changed according to the size of the luma block of the current block based on the color format of the current block, as described above with reference to FIG. 22.

When the third condition is satisfied ('YES' of S2415), the image decoding apparatus may determine whether the current block is included in an I slice (S2416).

When the current block is included in the I slice ('YES' of S2416), the prediction mode characteristic information may be determined to be a second value (e.g., 1) (S2414). In contrast, when the current block is not included in the I slice ('NO' of S2416), the prediction mode characteristic information may be determined to be a third value (e.g., 2) (S2417).

In contrast, when the third condition is not satisfied ('NO' of S2415), the prediction mode characteristic information may be determined to be a first value (e.g., 0) (S2412).

The image decoding apparatus may determine the prediction mode type modeType of the lower-layer block obtained by splitting the current block, based on the prediction mode characteristic information (S2420).

For example, when the prediction mode characteristic information has a first value (e.g., 0), the prediction mode type of the lower-layer block may be determined to be a prediction mode type modeTypeCurr of the current block.

Alternatively, when the prediction mode characteristic information has a second value (e.g., 1), the prediction mode type of the lower-layer block may be determined to be a second prediction mode type MODE_TYPE_INTRA.

Alternatively, when the prediction mode characteristic information has a third value (e.g., 2), it may be determined to be a second prediction mode type MODE_TYPE_INTRA or a third prediction mode type MODE_TYPE_INTER according to a predetermined condition. For example, when only an inter prediction mode is available, the prediction mode characteristic information may be determined to be a third prediction mode type MODE_TYPE_INTER. In contrast, when the inter prediction mode is not available, the prediction mode characteristic information may be determined to be the second prediction mode type MODE_TYPE_INTRA. In an example, whether the inter prediction mode is available may be determined by decoding a predetermined flag (e.g., mode_constraint_flag) obtained from a bitstream.

The image decoding apparatus may obtain the lower-layer block of the current block by splitting the current block based on the prediction mode type of the lower-layer block (S2430). For example, when the prediction mode type of the lower-layer block is the second prediction mode type MODE_TYPE_INTRA, the image decoding apparatus may obtain the lower-layer block by splitting the current block to have a dual tree structure. In contrast, when the prediction mode type of the current block is not the second prediction mode type MODE_TYPE_INTRA (for example, when the prediction mode type of the current block is a first prediction mode type MODE_TYPE_ALL or a third prediction mode type MODE_TYPE_INTER), the image decoding apparatus may obtain the lower-layer block by splitting the current block according to the same method as the split structure of the current block (e.g., a single tree structure or a dual tree structure).

The split structure of the lower-layer block is determined to be a dual tree structure, whether to split the luma block and chroma block of the current block may be independently determined. For example, whether to split the chroma block of the current block may be determined based on the prediction mode characteristic information mode_type_condition determined according to the color format of the current block as described above with reference to FIG. 22.

The image decoding apparatus may decode the lower-layer block based on the prediction mode type of the lower-layer block (S2440). For example, when the prediction mode type of the lower-layer block is a first prediction mode type MODE_TYPE_ALL, the image decoding apparatus may decode the lower-layer block based on one of an intra prediction mode, IBC, a palette mode and an inter prediction mode. In this case, the prediction mode applying to the lower-layer block may be determined by decoding a predetermined flag (e.g., pred_mode_flag) obtained from a bitstream.

Alternatively, when the prediction mode type of the lower-layer block is the second prediction mode type MODE_TYPE_INTRA, the image decoding apparatus may decode the lower-layer block based on an intra prediction mode.

Alternatively, when the prediction mode type of the lower-layer block is the third prediction mode type MODE_TYPE_INTER, the image decoding apparatus may decode the lower-layer block based on the inter prediction mode.

According to the image decoding method according to an embodiment of the present disclosure, by determining the split mode of the lower-layer block based on a at least one of the color format, split mode or size of the current block, it is possible to more improve encoding efficiency without violating the minimum size limit of the chroma block.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 25:
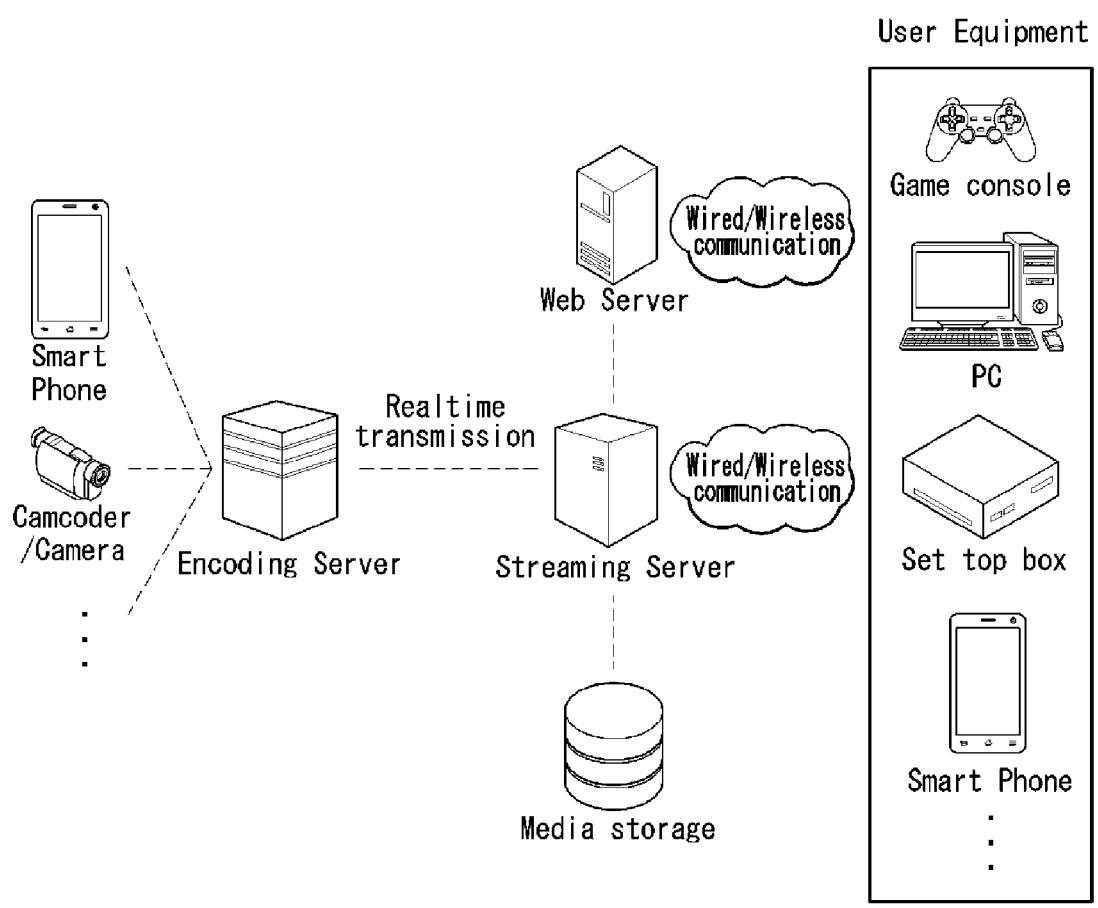
FIG. 25 is a view showing a content streaming system, to which an embodiment of the present disclosure is applicable.

FIG. 25 is a view showing a contents streaming system, to which an embodiment of the present disclosure is applicable.

As shown in FIG. 25, the contents streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the contents streaming system may include a separate control server. In this case, the control server serves to control a command/response between devices in the contents streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the contents streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:
   determining prediction mode characteristic information based on a color format of a current block;
   determining a prediction mode type of a lower-layer block split from the current block based on the prediction mode characteristic information;
   obtaining the lower-layer block by splitting the current block based on the prediction mode type of the lower-layer block; and
   decoding the lower-layer block based on the prediction mode type of the lower-layer block,
   wherein the prediction mode type of the lower-layer block comprises a first prediction mode type specifying that both an intra prediction mode and an inter prediction mode are available, a second prediction mode type specifying that only the intra prediction mode is available and a third prediction mode type specifying that only the inter prediction mode is available,
   wherein, based on a first condition for the current block being satisfied, the prediction mode characteristic information has a first value, and the first condition comprises a case where a color format of the current block is a monochrome format or a 4:4:4 format, and
   wherein, based on the first condition for the current block being not satisfied, the prediction mode characteristic information has a second value or a third value based on at least one of a color format, split mode or size of the current block.

2. The image decoding method of claim 1, wherein, based on the prediction mode characteristic information having the first value, the prediction mode type of the lower-layer block is determined to be the same prediction mode type as the prediction mode type of the current block.

3. The image decoding method of claim 1, wherein, based on the prediction mode characteristic information having the second value, the prediction mode type of the lower-layer block is determined to be the second prediction mode type.

4. The image decoding method of claim 1, wherein, based on the prediction mode characteristic information having the third value, the prediction mode type of the lower-layer block is determined to be the second prediction mode type or the third prediction mode type, based on whether the inter prediction mode is available.

5. The image decoding method of claim 4, wherein whether the inter prediction mode is available is determined by decoding a flag obtained from a bitstream.

6. The image decoding method of claim 1, wherein, based on the prediction mode type of the lower-layer block being determined to be the second prediction mode type, the lower-layer block is obtained by splitting the current block with a dual tree structure.

7. The image decoding method of claim 1, wherein, based on the prediction mode type of the lower-layer block being determined to be the first prediction mode type or the third prediction mode type, the lower-layer block is obtained by splitting the current block in the same manner as the split structure of the current block.

8. The image decoding method of claim 1, wherein, based on the prediction mode type of the lower-layer block being determined to be the first prediction mode type, the lower-layer block is decoded based on a prediction mode determined by decoding a flag obtained from a bitstream.

9. The image decoding method of claim 1, wherein, based on a product of a width and height of a luma block of the current block being 64 and a split mode of the current block being a quadtree split mode, the prediction mode characteristic information has the second value.

10. The image decoding method of claim 1, wherein, based on a product of a width and height of a luma block of the current block being 64 and a split mode of the current block being a ternary split mode, the prediction mode characteristic information has the second value.

11. The image decoding method of claim 1, wherein, based on a product of a width and height of a luma block of the current block being 64, a split mode of the current block being a binary split mode and the color format of the current block is a 4:2:0 format, the prediction mode characteristic information has the second value or the third value based on whether the current block is included in an I slice.

12. The image decoding method of claim 1, wherein, based on a product of a width and height of a luma block of the current block being 128, a split mode of the current block being a ternary split mode and the color format of the current block is a 4:2:0 format, the prediction mode characteristic information has the second value or the third value based on whether the current block is included in an I slice.

13. An image encoding method performed by an image encoding apparatus, the image encoding method comprising:
   determining prediction mode characteristic information based on a color format of a current block;
   determining a prediction mode type of a lower-layer block split from the current block based on the prediction mode characteristic information;
   obtaining the lower-layer block by splitting the current block based on the prediction mode type of the lower-layer block; and
   encoding the lower-layer block based on the prediction mode type of the lower-layer block,
   wherein the prediction mode type of the lower-layer block comprises a first prediction mode type specifying that both an intra prediction mode and an inter prediction mode are available, a second prediction mode type specifying that only the intra prediction mode is available and a third prediction mode type specifying that only the inter prediction mode is available,
   wherein, based on a first condition for the current block being satisfied, the prediction mode characteristic information has a first value, and the first condition comprises a case where a color format of the current block is a monochrome format or a 4:4:4 format, and
   wherein, based on the first condition for the current block being not satisfied, the prediction mode characteristic information has a second value or a third value based on at least one of a color format, split mode or size of the current block.

14. A method of transmitting a bitstream generated by the image encoding method of claim 13.

* * * * *